US007219182B2

(12) United States Patent
Byers et al.

(10) Patent No.: US 7,219,182 B2
(45) Date of Patent: May 15, 2007

(54) METHOD AND SYSTEM FOR USING AN EXTERNAL BUS CONTROLLER IN EMBEDDED DISK CONTROLLERS

(75) Inventors: Larry L. Byers, Apple Valley, MN (US); Joseba M. Desubijana, Minneapolis, MN (US); Gary R. Robeck, Albertville, MN (US); Fredarico E. Dutton, Garden Grove, CA (US)

(73) Assignee: Marvell International Ltd., Hamilton (BM)

( * ) Notice: Subject to any disclaimer, the term of this patent is extended or adjusted under 35 U.S.C. 154(b) by 424 days.

(21) Appl. No.: 10/385,056

(22) Filed: Mar. 10, 2003

(65) Prior Publication Data

US 2004/0199711 A1    Oct. 7, 2004

(51) Int. Cl.
G06F 13/14    (2006.01)
(52) U.S. Cl. ...................................... 710/305
(58) Field of Classification Search ................ 710/305, 710/306, 300, 8, 10, 11, 13, 15, 16, 25
See application file for complete search history.

(56) References Cited

U.S. PATENT DOCUMENTS

| 3,800,281 A | 3/1974 | Devore et al. |
| 3,988,716 A | 10/1976 | Fletcher et al. |
| 4,001,883 A | 1/1977 | Strout et al. |
| 4,016,368 A | 4/1977 | Apple, Jr. |
| 4,050,097 A | 9/1977 | Miu et al. |
| 4,080,649 A | 3/1978 | Calle |
| 4,156,867 A | 5/1979 | Bench et al. |
| 4,225,960 A | 9/1980 | Masters |
| 4,275,457 A | 6/1981 | Leighou et al. |
| 4,390,969 A | 6/1983 | Hayes |
| 4,451,898 A | 5/1984 | Palermo et al. |
| 4,486,750 A | 12/1984 | Aoki |
| 4,500,926 A | 2/1985 | Yoshimaru et al. |
| 4,587,609 A | 5/1986 | Boudreau et al. |
| 4,603,382 A | 7/1986 | Cole |
| 4,625,321 A | 11/1986 | Pechar et al. |

(Continued)

FOREIGN PATENT DOCUMENTS

EP    0528273    2/1993

(Continued)

OTHER PUBLICATIONS

PCI Local Bus Specification, Revision 2.1, Jun. 1, 1995, pp. 9-12, 21-23, 33-42, 108-109, 235-243.*

(Continued)

Primary Examiner—Christopher E. Lee
Assistant Examiner—Trisha Vu

(57) ABSTRACT

A system and method for an embedded disk controller is provided. The embedded disk controller includes a main processor in communication with a first bus. A second processor communicates with a second bus. An external bus interface controller ("EBC") located on the embedded disk controller manages a plurality of memory devices external to the system embedded disk controller via an external bus interface and coupled to the first bus and an external bus. Each of the plurality of memory devices has at least one of different timing characteristics and different data widths. The EBC is coupled to the first bus and stores at least one of a segment descriptor register and at least a device range register.

11 Claims, 49 Drawing Sheets

U.S. PATENT DOCUMENTS

| | | | |
|---|---|---|---|
| 4,667,286 A | 5/1987 | Young et al. | |
| 4,777,635 A | 10/1988 | Glover | |
| 4,805,046 A | 2/1989 | Kuroki et al. | |
| 4,807,116 A | 2/1989 | Katzman et al. | |
| 4,807,253 A | 2/1989 | Hagenauer et al. | |
| 4,809,091 A | 2/1989 | Miyazawa et al. | |
| 4,811,282 A | 3/1989 | Masina | |
| 4,812,769 A | 3/1989 | Agoston | |
| 4,860,333 A | 8/1989 | Bitzinger et al. | |
| 4,866,606 A | 9/1989 | Kopetz | |
| 4,881,232 A | 11/1989 | Sako et al. | |
| 4,920,535 A | 4/1990 | Watanabe et al. | |
| 4,949,342 A | 8/1990 | Shimbo et al. | |
| 4,970,418 A | 11/1990 | Masterson | |
| 4,972,417 A | 11/1990 | Sako et al. | |
| 4,975,915 A | 12/1990 | Sako et al. | |
| 4,989,190 A | 1/1991 | Kuroe et al. | |
| 5,014,186 A | 5/1991 | Chisholm | |
| 5,023,612 A | 6/1991 | Liu | |
| 5,027,357 A | 6/1991 | Yu et al. | |
| 5,050,013 A | 9/1991 | Holsinger | |
| 5,051,998 A | 9/1991 | Murai et al. | |
| 5,068,755 A | 11/1991 | Hamilton et al. | |
| 5,068,857 A | 11/1991 | Yoshida | |
| 5,072,420 A | 12/1991 | Conley | |
| 5,088,093 A | 2/1992 | Storch et al. | |
| 5,109,500 A | 4/1992 | Iseki et al. | |
| 5,117,442 A | 5/1992 | Hall | |
| 5,127,098 A | 6/1992 | Rosenthal et al. | |
| 5,133,062 A | 7/1992 | Joshi et al. | |
| 5,136,592 A | 8/1992 | Weng | |
| 5,146,585 A | 9/1992 | Smith, III | |
| 5,157,669 A | 10/1992 | Yu et al. | |
| 5,162,954 A | 11/1992 | Miller et al. | |
| 5,193,197 A | 3/1993 | Thacker | |
| 5,204,859 A | 4/1993 | Paesler et al. | |
| 5,218,564 A | 6/1993 | Haines et al. | |
| 5,220,569 A | 6/1993 | Hartness | |
| 5,237,593 A | 8/1993 | Fisher et al. | |
| 5,243,471 A | 9/1993 | Shinn | |
| 5,249,271 A | 9/1993 | Hopkinson | |
| 5,257,143 A | 10/1993 | Zangenehpour | |
| 5,261,081 A | 11/1993 | White et al. | |
| 5,271,018 A | 12/1993 | Chan | |
| 5,274,509 A | 12/1993 | Buch | |
| 5,276,564 A | 1/1994 | Hessing et al. | |
| 5,276,662 A | 1/1994 | Shaver, Jr. et al. | |
| 5,276,807 A | 1/1994 | Kodama | |
| 5,280,488 A | 1/1994 | Glover et al. | |
| 5,285,327 A | 2/1994 | Hetzler | |
| 5,285,451 A | 2/1994 | Henson | |
| 5,301,333 A | 4/1994 | Lee | |
| 5,307,216 A | 4/1994 | Cook et al. | |
| 5,315,708 A | 5/1994 | Eidler et al. | |
| 5,329,630 A | 7/1994 | Baldwin | |
| 5,339,443 A | 8/1994 | Lockwood | |
| 5,349,667 A | 9/1994 | Kaneko | |
| 5,361,266 A | 11/1994 | Kodama et al. | |
| 5,361,267 A | 11/1994 | Godiwala et al. | |
| 5,375,248 A * | 12/1994 | Lemay et al. | 713/600 |
| 5,408,644 A | 4/1995 | Schneider | |
| 5,408,673 A | 4/1995 | Childers et al. | |
| 5,420,984 A | 5/1995 | Good et al. | |
| 5,428,627 A | 6/1995 | Gupta | |
| 5,440,751 A | 8/1995 | Santeler et al. | |
| 5,465,343 A | 11/1995 | Henson | |
| 5,487,170 A | 1/1996 | Bass | |
| 5,488,688 A | 1/1996 | Gonzales | |
| 5,491,701 A | 2/1996 | Zook | |
| 5,500,848 A | 3/1996 | Best et al. | |
| 5,506,989 A | 4/1996 | Boldt | |
| 5,507,005 A | 4/1996 | Kojima | |
| 5,519,837 A | 5/1996 | Tran | |
| 5,523,903 A | 6/1996 | Hetzler et al. | |
| 5,544,180 A | 8/1996 | Gupta | |
| 5,544,346 A | 8/1996 | Amini | |
| 5,546,545 A | 8/1996 | Rich | |
| 5,546,548 A | 8/1996 | Chen | |
| 5,557,764 A | 9/1996 | Stewart et al. | |
| 5,563,896 A | 10/1996 | Nakaguchi | |
| 5,572,148 A | 11/1996 | Lytle et al. | |
| 5,574,867 A | 11/1996 | Khaira | |
| 5,581,715 A | 12/1996 | Verinsky et al. | |
| 5,583,999 A | 12/1996 | Sato | |
| 5,590,380 A | 12/1996 | Yamada et al. | |
| 5,592,404 A | 1/1997 | Zook | |
| 5,600,662 A | 2/1997 | Zook et al. | |
| 5,602,857 A | 2/1997 | Zook et al. | |
| 5,603,035 A | 2/1997 | Erramoun et al. | |
| 5,615,190 A | 3/1997 | Best et al. | |
| 5,623,672 A | 4/1997 | Popat | |
| 5,626,949 A | 5/1997 | Blauer et al. | |
| 5,627,695 A | 5/1997 | Prins et al. | |
| 5,640,602 A | 6/1997 | Takase | |
| 5,649,230 A | 7/1997 | Lentz | |
| 5,659,759 A | 8/1997 | Yamada | |
| 5,664,121 A | 9/1997 | Cerauskis | |
| 5,689,656 A | 11/1997 | Baden | |
| 5,691,994 A | 11/1997 | Acosta | |
| 5,692,135 A | 11/1997 | Alvarez | |
| 5,692,165 A | 11/1997 | Jeddeloh et al. | |
| 5,719,516 A | 2/1998 | Sharpe-Geisler | |
| 5,729,511 A | 3/1998 | Schell et al. | |
| 5,729,718 A | 3/1998 | Au | |
| 5,734,848 A * | 3/1998 | Gates et al. | 710/315 |
| 5,740,466 A | 4/1998 | Geldman | |
| 5,745,793 A | 4/1998 | Atsatt et al. | |
| 5,754,759 A | 5/1998 | Clarke | |
| 5,758,188 A | 5/1998 | Appelbaum et al. | |
| 5,768,044 A | 6/1998 | Hetzler et al. | |
| 5,784,569 A | 7/1998 | Miller | |
| 5,787,483 A | 7/1998 | Jam et al. | |
| 5,794,073 A | 8/1998 | Ramakrishnan | |
| 5,801,998 A | 9/1998 | Choi | |
| 5,818,886 A | 10/1998 | Castle | |
| 5,822,142 A | 10/1998 | Hicken | |
| 5,826,093 A * | 10/1998 | Assouad et al. | 712/43 |
| 5,831,922 A | 11/1998 | Choi | |
| 5,835,930 A | 11/1998 | Dobbek | |
| 5,841,722 A | 11/1998 | Willenz | |
| 5,844,844 A | 12/1998 | Bauer et al. | |
| 5,850,422 A | 12/1998 | Chen | |
| 5,854,918 A | 12/1998 | Baxter | |
| 5,890,207 A | 3/1999 | Sne et al. | |
| 5,890,210 A | 3/1999 | Ishii et al. | |
| 5,907,717 A | 5/1999 | Ellis | |
| 5,912,906 A | 6/1999 | Wu et al. | |
| 5,925,135 A | 7/1999 | Trieu et al. | |
| 5,928,367 A | 7/1999 | Nelson et al. | |
| 5,937,435 A | 8/1999 | Dobbek et al. | |
| 5,950,223 A | 9/1999 | Chiang et al. | |
| 5,968,180 A | 10/1999 | Baco | |
| 5,983,293 A | 11/1999 | Murakami | |
| 5,991,911 A | 11/1999 | Zook | |
| 6,021,458 A | 2/2000 | Jayakumar et al. | |
| 6,029,226 A | 2/2000 | Ellis et al. | |
| 6,029,250 A | 2/2000 | Keeth | |
| 6,041,417 A | 3/2000 | Hammond et al. | |
| 6,065,053 A | 5/2000 | Nouri | |
| 6,067,206 A | 5/2000 | Hull et al. | |
| 6,070,200 A | 5/2000 | Gates et al. | |
| 6,078,447 A | 6/2000 | Sim | |
| 6,081,849 A | 6/2000 | Born et al. | |
| 6,081,867 A | 6/2000 | Cox | |

| | | |
|---|---|---|
| 6,092,231 A | 7/2000 | Sze |
| 6,094,320 A | 7/2000 | Ahn |
| 6,105,119 A | 8/2000 | Kerr et al. |
| 6,115,778 A | 9/2000 | Miyake et al. |
| 6,124,994 A | 9/2000 | Malone, Sr. |
| 6,134,063 A | 10/2000 | Weston-Lewis et al. |
| 6,157,984 A | 12/2000 | Fisher |
| 6,178,486 B1 | 1/2001 | Gill |
| 6,192,499 B1 | 2/2001 | Yang |
| 6,201,655 B1 | 3/2001 | Watanabe et al. |
| 6,223,303 B1 | 4/2001 | Billings et al. |
| 6,279,089 B1 | 8/2001 | Schibilla et al. |
| 6,297,926 B1 | 10/2001 | Ahn |
| 6,314,480 B1 | 11/2001 | Nemazie et al. |
| 6,330,626 B1 * | 12/2001 | Dennin et al. ............... 710/52 |
| 6,381,659 B2 | 4/2002 | Proch et al. |
| 6,401,149 B1 | 6/2002 | Dennin et al. |
| 6,401,154 B1 | 6/2002 | Chiu et al. |
| 6,421,760 B1 * | 7/2002 | McDonald et al. ......... 711/114 |
| 6,470,461 B1 | 10/2002 | Pinvidic et al. |
| 6,487,631 B2 | 11/2002 | Dickinson et al. |
| 6,490,635 B1 | 12/2002 | Holmes |
| 6,496,517 B1 | 12/2002 | Gehman et al. |
| 6,515,813 B2 | 2/2003 | Kitazaki et al. |
| 6,530,000 B1 | 3/2003 | Krantz et al. |
| 6,574,676 B1 | 6/2003 | Megiddo |
| 6,629,204 B2 * | 9/2003 | Tanaka et al. .............. 711/114 |
| 6,651,126 B1 | 11/2003 | Cantrell et al. |
| 6,662,253 B1 * | 12/2003 | Gary et al. ................. 710/244 |
| 6,662,334 B1 | 12/2003 | Stenfort |
| 6,694,398 B1 | 2/2004 | Zhao et al. |
| 6,711,643 B2 | 3/2004 | Park et al. |
| 6,721,828 B2 * | 4/2004 | Verinsky et al. .............. 710/62 |
| 6,742,065 B1 | 5/2004 | Suh |
| 6,826,650 B1 | 11/2004 | Krantz |
| 6,917,997 B2 | 7/2005 | Bhagat |
| 6,950,258 B2 | 9/2005 | Takaishi |
| 6,952,749 B2 | 10/2005 | Kim |
| 2001/0043424 A1 | 11/2001 | Nguyen |
| 2001/0044873 A1 | 11/2001 | Wilson et al. |
| 2002/0080698 A1 | 6/2002 | Turner et al. |
| 2003/0037225 A1 | 2/2003 | Deng et al. |
| 2003/0070030 A1 | 4/2003 | Smith et al. |
| 2003/0084269 A1 | 5/2003 | Drysdale et al. |
| 2003/0204655 A1 | 10/2003 | Schmisseur et al. |

FOREIGN PATENT DOCUMENTS

| | | |
|---|---|---|
| EP | 0622726 | 11/1994 |
| EP | 0718827 | 6/1996 |
| GB | 2285166 | 6/1995 |
| JP | 63-292462 | 11/1988 |
| JP | 01-315071 | 12/1989 |
| JP | 03183067 | 8/1991 |
| WO | 98/14861 | 4/1988 |

OTHER PUBLICATIONS

Structure Computer Organization, 3rd Edition, by Andrew S. Tanenbaum, pp. 11-13.*
"Memory and Peripheral Interface", Chapter 5—LH77790A/B User's Guide (Version 1.0), pp. 5-1 to 5-35.*
Information technology-Small Computer System Interface-2 (SCSI-2), Revision 10L, Sep. 7, 1993, pp. 31-46, 91-93, 104-108, 118, 135, 161, and 233.*
Structure Computer Organization, 3rd Edition, by Andrew S. Tanenbaum, pp. 11-13.*
"Memory and Peripheral Interface", Chapter 5—LH77790A/B User's Guide (Version 1.0), pp. 5-1 to 5-35.*
PCT International Search Report, Doc. No. PCT/US00/15084, Dated Nov. 15, 2000, 2 Pages.
Blathut R. Digital Transmission of Information (Dec. 4, 1990), pp. 429-430.
Hwang, Kai and Briggs, Faye A., "Computer Architecture and Parallel Processing" pp. 156-164.
Zeidman, Bob, "Interleaving DRAMS for faster access", System Design ASIC & EDA, pp. 24-34 (Nov. 1993).
P.M. Bland et. al. Shared Storage Bus Circuitry, IBM Technical Disclosure Bulletin, vol. 25, No. 4, Sep. 1982, pp. 2223-2224.
PCT search report for PCT/US00/07780 mailed Oct. 2, 2000, 4 Pages.
PCT Search Report for PCT/US01/22404 mailed Jan. 29, 2003, 4 Pages.
"Memory and Peripheral Interface", Chapter 5—LH77790A/B User's Guide (Version 1.0) pp. 5-1 to 5-35.
PCT International Search Report, Doc. No. PCT/US2004/007119, Dated Aug. 25, 2005.
"Embedded Risc Microcontroller Core ARM7TDMI". Revision 0673CS- Nov. 1999. Atmel Corporation.

* cited by examiner

| Signal | Count | Description |
|---|---|---|
| HCLK | 1 | AHB Bus clock controls register loads, status reads and synchronizes bus transactions to the bus master. Operations in EBI controller 228 occur on low to high assertion of the signal. This signal controls the timing profile on the External Bus |
| HRESETn | 1 | AHB Bus reset signal.: Asserted active low when the AHB Bus 236 is reset. When this signal is asserted all registers are cleared or set to a default value, in EBI controller 228. |
| HTRANS | 2 | AHB Bus Transfer indicates the type of transfer a current AHB Bus 236 transaction the bus master is executing (NONSEQUENTIAL, SEQUENTIAL, IDLE or BUSY). EBI controller 228 uses this information to determine the transfer type and Response (HRESPEBI) that will be returned to the bus master. |
| HRDDR | 26 | AHB Address These bits of AHB Bus 236 system address specify the external memory address or the internal memory mapped regiser the bus master is accessing in EBI controller 228 address space. |
| HWRITE | 1 | AHB Bus Write specifies whether the AHB Bus 236 transactions to EBI controller 228 are a read (HWRITE = 0)access or a write (HWRITE = 1) access. EBI controller 228 registers this signal and reflects this signal on the External Bus Interface 227 by driving the appropriate write signal (XWEn). |

*FIG. 4A*

| Signal | Count | Description |
|---|---|---|
| 304 — HWDATA | 32 | AHB Write Data. These signals transfer data from the bus master to the EBI controller 228, which captures these signals and loads internal registers or drives the write data onto the External Bus during a write (store) transaction. |
| 306 — HREADYin | 1 | AHB Bus Ready In indicates a AHB Bus 236 transaction has completed on the bus and a new transaction may start. EBI controller 228 uses the assertion of this signal to enable loading address and control information (AHB Address, AHB Transfer, AHB Write, HSIZE and HSELEBI). |
| 307 — HSELEBI | 1 | AHB Select EBI Bridge. This signal is asserted by the AHB 236 Address Decoder Module decoding the most significant bits of the AHB Address (HADDR), which selects EBI controller 228. EBI controller 228 samples this signal when HREADY in is asserted. |
| 308 — HSIZE | 2 | AHB Bus Size specifies the size of the requested transfer, byte, half word, or word to EBI controller 228. |
| 313 — XRDATA | 32 | External Bus Interface Read Data is the data returned to EBI controller 228 from the External Bus. EBI controller 228 presents this data to the AHB Bus 236 on HRDATAEBI |
| 310 — TicMode | 1 | Test Interface Controller Mode is asserted when System 200 is in production test mode. EBI controller 228 provides the read data from the AHB Bus 228 to a Test Bus. |

*FIG. 4B*

| Signal | Count | Description |
|---|---|---|
| TicRead | 1 | Test Interface Controller Read is asserted when reading data from the AHB Bus 236 for test purpose. |
| ExtBusCnfg | 2 | External Bus Configuration specifies the External Bus width that the EBI Controller 228 application is supporting. 00 = bus disabled, 01b = 8 bit bus, 10 = 16 bit bus and 11b = 32 bit bus |
| HRDATAin | 32 | AHB Bus Read Data in that is returned to a "Test Bus" by EBI Controller 228. |

311 — TicRead row
312 — ExtBusCnfg row
309 — HRDATAin row

FIG. 4C

| Signal | Count | Description |
|---|---|---|
| HREADYEBI | 1 | EBI Bridge HREADY: When EBI controller 228 is selected to respond to a bus master, EBI controller 228 asserts this signal indicating that it has completed the requested bus transaction. Depending on the access requested, EBI controller 228 deasserts this signal to insert wait states on AHB Bus 208 while converting the access to an External Bus transaction. |

314 — HREADYEBI row

FIG. 5A

| Signal | Count | Description |
|---|---|---|
| HRESPEBI | 2 | *EBI Bridge Response:* *When EBI controller 228 is selected to respond to a bus master, this signal controlled by EBI controller 228, indicates the status of the requested bus transaction it has completed.* |
| HRDATAEBI | 32 | *EBI Bridge Read Data.* *These signals are used to return read data from EBI controller 228 through the Slave to Master Multiplexer to the requesting AHB Bus master. EBI controller 228 either transfer data from the External Bus or from an internal EBI Bridge 228 register to AHB Bus 236.* |
| XADDR | 25 | *EBI Bridge External Bus Address.* *APB Bridge 235 provides address space to the External Bus.* |
| XADDR_OE | 1 | *EBI Bridge External Bus Address Enable.* *This signal is sent to External Bus Input/Output Cell to enable the External Bus address tri-state drivers.* |
| XWDATA | 32 | *EBI Bridge External Bus Write Data:* *During write transfers to the External Bus, the EBI controller 228 registers the write data from AHB Bus 208 and drives these signals with the write data during a write transaction to the External Bus Input/Output Cells.* |

*FIG. 5B*

| Signal | Count | Description |
|---|---|---|
| XWDATA_OE | 1 | EBI Bridge External Bus Write Data Enable. This signal is asserted by the EBI controller 228 when writing data to the External Bus to enable the tri-state drivers in the External Bus Input/Output Cells. This signal is deasserted when the EBI Bridge is reading data from the External Bus. |
| XCSn | 4 | External Bus Select: HADDR and the Device Allocation Register are decoded to select an External Bus Device. When an External Bus transaction is requested and validated one of these signals is asserted by the EBI controller 228 selecting the Device if the External Bus is enabled. |
| XWEn | 4 | External Bus Byte Write Enable: The EBI controller 228 asserts these signals when the bus master specifies a write to the External Bus based on HWRITE and the information provided in HSIZE(1:0). During a read transaction these signals are all deasserted. |
| XOEn | 1 | External Bus Read Enable. This signal is asserted by the EBI controller 228 to enable the tri-state drivers in the selected External Bus Device so it can transmit the requested read data on the External Bus data (XD). This signal is deasserted during a write transaction. |

*FIG. 5C*

| Function |
|---|
| WHW - Write Hold Wait state (write data hold time) specifies the number of HCLKs between the deassertion of the Write Enables (XWEn) and when the EBI controller 228 stops driving or switches write data (XD) and Address (XA1+2). — 601A |
| TRW - Transaction Recovery Wait States specifies the number of HCLKs to wait after a transaction completes before the EBI controller 228 may select a device for the next transaction. This insures that there is sufficient bus clearing time before the next device is selected with the assertion of XCSn[x]. — 601B |
| SW2 - Setup 2 Wait States specifies the number of HCLKs to wait between the assertion of XCSn[x] and the assertion of the Write Enables (XWEn), or the assertion of Address, XA1+2, to the Write Enables (XWEn) during a word write or the assertion of XCSn[x] and the assertion of the Output Enable. — 601C |
| SW1 - Setup 1 Wait States specifies the number of HCLKs to wait between the assertion of XA and the assertion of XCSn[x]. — 601D |
| DW - Data Width specifies the data width of the External Bus Device. The width specified for the device is equal to or less than the physical width of the External Bus specified by ExtBusCnfg. If DW is greater than ExtBusCnfg an Error Response may be returned to the AHB Bus master 00b = 8 bits, Byte 01b = 16 bits, Half word 10b = 32 bits, Word 11b = undefined - Return an Error Response to the AHB Bus master. — 601E |
| WW - Write Wait States specifies the number of HCLKs it takes to write a memory device (XWEn) — 601F |
| RW - Read Wait State specifies the number of HCLKs it takes to read the device from the assertion of XOEn. — 601G |

*FIG. 7*

| Function |
|---|
| EN-Enable. This bit is set to access the address range of the Device. |
| DvRng-Device Range. This field specifies the maximum number of blocks that may be addressed within the Device address space |

FIG. 8

| Function |
|---|
| Reserved |
| ExtBusCnfg - External Bus Configuration is read only for input ports to EBI Controller 228 that specify the External Bus width. The state of these specify the External Bus that the EBI controller 228 supports. |
| DvAllct - Device Allocation specifies the allocation of Device on the External Bus. For example:<br>00b - External Bus Disabled<br>01b - 1 Device   10b - 2 Devices   11b - 4 Devices |

FIG. 9

| Signal | Count | Description |
|---|---|---|
| PCLK | 1 | APB Bus Clock: This clock signal controls register loads, status reads and synchronizes interrupt signals to MP 240 |
| PRESETn | 1 | APB Bus Reset signal: Asserted active low when APB Bus 208 is reset. When this signal is asserted all registers are cleared to a default value interrupts are disabled in IC Module 207. |
| PENABLE | 1 | APB Bus Enable signal that is asserted high active for 1 clock cycle by APB Bridge 235 to enable all register accesses in Interrupt Controller Module 207. |
| PSELIC | 1 | APB Bus Interrupt Controller Select: When this signal is asserted high IC Module 207 has been selected by APB Bridge 235 for current APB Bus 208 transaction. One "select" signal is provided for each APB Bus slave. |
| PADDR | [7:0] | APB Bus Address: These bits are from APB Bus 208. IC Module 207 decodes these bits to select the appropriate register during an APB Bridge 235 access. These signals are asserted by APB Bridge 235 at the start of the transaction and remains asserted until the transaction completes. |

FIG. 17A

| Signal | Count | Description |
|---|---|---|
| PWRITE | 1 | APB Bus Write. This signal indicates a write transaction when asserted high and a read transaction when asserted low. This signal is asserted by APB Bridge 235 at the beginning of the transaction and remains asserted until the transaction completes. |
| PWDATA | [31:00] | APB Bus Write Data. APB Bridge 235 drives these signals. APB Bridge 235 provides the write data on these signals when executing a write transaction to IC Module 207. |
| FIQESOURCE | 1 | The signal indicates a fast interrupt request has been made. |
| IRQESOURCE | [15:00] | Interrupt Request Source (IRQ) signals to IC Module 207. |

| Signal | Count | Description |
|---|---|---|
| PRDATA | [31:00] | APB Bus 208 Read Data: When APB Bridge 235 selects (PSELIC) IC Module 207 and the PWRITE signal is asserted low, IC Module 207 supplies read data based on the decode of the PADDR[7:0] |
| FIQn | 1 | Active low. Fast Interrupt Request to MP 240. |
| IRQn | 1 | Active low Interrupt Request to MP 240. |
| SysInt | 1 | Asserted when either FIQn or IRQn is asserted. |
| PADREXCPT | 1 | APB Bus 208 Address Exception. Asserted high when Timer Module 206 detects an "address exception". |

*FIG. 18*

| Read, PWRITE asserted low | Write, PWRITE asserted high |
|---|---|
| ICIRQCurrentInt | Undefined |
| ICIntMask | ICIntMaskSet |
| Undefined | ICIntMaskClear |
| ICFIQControl | ICFIQControl |
| ICIRQ0-1Control | ICIRQ0-1Control |
| ICIRQ2-3Control | ICIRQ2-3Control |
| ICIRQ4-5Control | ICIRQ4-5Control |
| ICIRQ6-7Control | ICIRQ6-7Control |
| ICIRQ8-9Control | ICIRQ8-9Control |
| ICIRQ10-11Control | ICIRQ10-11Control |
| ICIRQ12-13Control | ICIRQ12-13Control |
| ICIRQ14-15Control | ICIRQ14-15Control |
| Undefined | ICEOInt |
| ICRawInt | Undefined |
| ICIntReqPending | Undefined |
| ICIntReqSent | Undefined |
| ICTestControl | ICTestControl |
| ICIntTestSource | ICIntTestSource |
| ICFIQCurrentInt | Undefined |

*FIG. 19*

|  | Function |
|---|---|
|  | Reserved. |
| 1905A | IRQValid - When = 1 indicates that there is a Interrupt Request (IRQn) is asserted to MP 240. When = 0 IRQn is deasserted to MP 240. |
| 1905B | Vector Address of the highest priority interrupt resolved by Interrupt Controller Module 207 at the time this register is read. |

|  | Function |
|---|---|
| 1903B | FIQIntMask - This is the mask bit for the FIQ interrupt. Unmasked = 0, Masked = 1. |
| 1903A | IRQIntMask - These are the mask bits for the IRQ interrupt sources (IRQESOURCE).Unmasked = 0,Masked = 1. |

|  | Function |
|---|---|
| 1904A | MK - Read Only - a copy (FIQIntMask) of the ICIntMask[31] |
| 1904B | IRS - Read Only |
| 1904C | IRP - Read Only |
| 1904D | PLR |
| 1904E | TM |

| | Function |
|---|---|
| 1901A | MK - Read Only -a copy of odd source interrupt mask from the ICIntMask register. |
| 1901B | Odd interrupt source IRS - Read Only |
| 1901C | Odd interrupt source IRP - Read Only |
| 1901D | Odd interrupt source PLR |
| 1901E | Odd interrupt source TM |
| 1901F | Odd interrupt source Vector |
| 1901G | MK - Read Only -a copy of even source interrupt mask from the ICIntMask register |
| 1901I | Even interrupt source IRS - Read Only |
| 1901H | Even interrupt source IRP - Read Only |
| 1901J | Even interrupt source PLR |
| 1901K | Even interrupt source TM |
| 1901L | Even interrupt source Vector |

*FIG. 23*

| Signal | Count | Description |
|---|---|---|
| PCLK | 1 | APB Bus Clock. This signal controls register loads, status reads and is the time base for History module 234. All tasks in History module 234 occur on the low to high assertion of this signal. |
| PRESETn | 1 | APB Bus Reset signal. Asserted active low when APB Bus 208 is reset. When this signal is asserted all registers are cleared to their default value. History module 234 is placed in an idle state after reset. |
| PENABLE | 1 | APB BusEnable. Enable signal that is asserted high active for 1 clock cycle by APB Bridge 235 to enable all register accesses to History module 234. This signal is used to record APB Bus 208 transactions. |
| PSELABPHS | 1 | APB Bus Select Address Break Point History Stack. When this signal is asserted high History module 234 is selected by APB Bridge 235 for APB Bus 208 transaction. |
| PADDR | 19 | APB Bus Address. These bits are from APB Bus 208 address bus. History module 234 decodes PADDR (8 bits) to select the appropriate register during an APB Bridge 235 access. These signals are asserted by APB Bridge 235 at the start of a transaction and remain asserted until the transaction completes. History module 234 records PADDR when APB Bus 208 is being recorded. |
| PSEL, PSEL | 13 | Peripheral Selects - These signals are recorded by History module 234 when the APB Bus 208 is being recorded. PSELABPHS is the same as PSEL. |

*FIG. 32A-1*

| Signal | Count | Description |
|---|---|---|
| PWRITE | 1 | APB Bus Write. This APB Bus 208 signal indicates a write transaction when asserted high and a read transaction when asserted low. This signal is asserted by APB Bridge 235 at the beginning of a transaction and remains asserted until the transaction is completed. History module 234 records this information when APB Bus 208 is being recorded. History module 234 uses this information while recording to determine if the data recorded is "read" (PRDATAin1612A) or "write data" (PWDATA1607). |
| PWDATA | 32 | APB Bus Write Data. APB Bridge 235 drives these signals. APB Bridge 235 provides the associated data when executing a write transaction. History module 234 records this information when APB Bus 208 is being recorded and the transaction is a write. |
| PRDATAin | 32 | APB Bus Read Data in. History module 234 records the read data on the APB Bus 208 during a read transaction. |
| HTRANS | 2 | AHB Bus Bus Transfer: indicates the type of transfer the current AHB Bus 236 transaction the bus master is executing (NONSEQUENTIAL, SEQUENTIAL, IDLE or BUSY). History module 234 records this information when AHB Bus 236 is being recorded. |
| HADDR | 32 | AHB Address: These bits specify the system address that the bus master accessing at a given instance. History module 234 records this information when AHB Bus 236 is being recorded. |

FIG. 32A-2

| Signal | Count | Description |
|---|---|---|
| HWRITE | 1 | AHB Bus Write specifies whether AHB Bus 236 transaction is read (HWRITE=0) access or a write (HWRITE=1) access. History module 234 records this information when AHB Bus 236 is being recorded. History module 234 uses this information to determine which data to record. HRDATA or HWDATA. |
| HWDATA | 32 | AHB Write Data: These signals transfer data from the bus master to an AHB Bus 236 slave. History module 234 records this information when AHB Bus 236 is being recorded and HWRITE=1. |
| HREADYin | 1 | APB Bus Ready In indicates that an AHB Bus 236 transaction has completed on the bus and new transactions may start. History module 234 uses the assertion of this signal to enable loading address and control information (HADDR, HTRANS, HWRITE, HSIZE and HBURST for the next recording. |
| HSIZE | 2 | AHB Bus Size specifies the size of a requested transfer, byte, half word, or word on AHB Bus 236. History module 234 records this information when AHB Bus 236 is being recorded. |
| HBURST | 3 | AHB Bus Burst. These signals indicate if the requested AHB Bus 236 transaction is part of a burst transfer and whether the burst is incrementing or wrapping (see section). History module 234 records this information when AHB Bus 208 is being recorded. |

*FIG. 32A-3*

| Signal | Count | Description |
|---|---|---|
| HRDATA | 32 | AHB Bus Read Data: is returned to History module 234 for recording a AHB Bus 236 read (HWRITE = 0) transaction. |
| HRESP | 2 | AHB Bus Response. The transaction response from a selected AHB Bus 236 slave. History module 234 records this information when AHB Bus 236 is being recorded. |
| HPROT | 2 | AHB Bus Protection. HPROT = 0 = User access. HPROT = 1 = Privileged access. HPROT = 0 = Instruction Fetch, HPROT = 1 = Data (operand) Fetch. History module 234 records this information when AHB Bus 236 is being recorded. |
| HslvSel | 8 | AHB Bus Slave Select. Each AHB Bus 236 has its own select signal. These signals are a copy of the slave select signals generated by AHB Bus 236 Address Decoder Module. History module 234 uses these signals for filtering transactions on AHB Bus 236. |
| EXTRNLBPin | 1 | External Break Point in. This allows a condition external to System 200 to cause a break point if the Break Point Condition is set. For example (BPCndtn) = 110b |
| SysInt | 1 | System Interrupt. This is an "or" of the FIQn and IRQn signals out of Interrupt Controller 207. When either interrupt signal is asserted (low) this signal is asserted high indicating that an interrupt is present for handling by MP 240. |

*FIG. 32A-4*

| Signal | Count | Description |
|---|---|---|
| PRDATA | 32 | APB Bus 208 Read Data. When APB Bridge 235 selects (PSELABPHS) HISTORY MODULE 234 and the PWRITE signal is asserted low the History MODULE 234 supplies read data based on the decode of the PADDR. |
| PADREXCPT | 1 | APB Bus Address Exception. Asserted high for one clock cycle (edge triggered interrupt) when History Module 234 detects an "address exception". |
| ABPHSINT | 1 | Address Break Point History Stack Interrupt. This signal is asserted high for one clock cycle by History module 234 when a Break Point condition is detected and the interrupt is enabled (EnBPInt = 1). |
| ClkSlam | 1 | Clock Slam. Asserted by history module 234 when a Break Point conditions is detected and this signal is enabled (EnClkSlam = 1). |
| EXTBP | 1 | External Break Point. Asserted by History Module 234 when a Break Point conditions is detected. |

FIG. 32B

| Read, PWRITE asserted low | Write, PWRITE asserted high |
|---|---|
| History module 234 Control | History module Control |
| History Stack Address Pointer | History Stack Address Pointer |
| Address Break Point Pattern | Address Break Point Pattern |
| Data Address Break Point Pattern | Data Address Break Point Pattern |
| Address History | Undefined |
| Control History | Undefined |
| Data History | Undefined |
| Undefined | Undefined |
| Clear History Stack Buffer | Clear History Stack Buffer |
| Record Status | Set Enable Record |
| Undefined | Clear Enable Record and Status |

FIG. 33

| Function |
|---|
| Select Mask (SelMsk) - When the associated bit is set transactions to a component or peripheral are not recorded by History module 234. |
| Read Mask (RdMsk) - When this bit is set no read transactions will be recorded. |
| Write Mask (WrMsk) - Then this bit is set no write transactions will be recorded. |
| Enable Clock Slam (EnClkSlam) - When = 1 enables the Clock Slam signal. When = 0 disables the Clock Slam signal. |
| Enable Break Point Stop (EnBPStp) = 0 continue testing for the Break Point Condition. = 1 after detecting the Break Point condition stop testing for the Break Point condition. |

*FIG. 34A*

| Function |
|---|
| Enables the Break Point Interrupt (EnBPInt). 1 = Enabled. |
| Trigger Mode (TrgMd) - Specifies the number of entries that will be made in History module 234 Buffer after detection of the Break Point condition, for example, .00b = 0%, 01b = 50%, 10b = 100%, 11b = 100%. |
| Bus Record Select (BRcrdSel). 0b = Record AHB Bus 208 transactions, 1b = Record APB Bus 236 transactions. |
| Enables the Break Point (EnBP) condition. 1 = Enabled |
| Break Point Condition (BPCndtn). The following are examples of break point conditions used by history module 234. 000b = Data Break Point, 001b = Address Break Point, 010b = Address and Data Break Point, 011b = Address Range Break Point, 100b = Firmware Break Point, 101 = External Pin Break Point 110b or 111b = System Interrupt Break Point |

| Function |
|---|
| Reserved |
| History Stack Pointer (HstryStkPtr), provides the address where the next entry will be made or where the next entry will be read from History module 234 Buffers. Each time an entry is accessed this pointer is incremented. |

| Function |
|---|
| Recorded APB Bus PWRITE |
| Valid Entry |

FIG. 40

| Function |
|---|
| The register includes recorded AHB 236 Bus Data (BrcrdSel = 0) or APB Bus 208 Data (BrcrdSel = 1) stored in History module 234 entry specified by the HstryStkPtr. After reading this register History module 234 increments HstryStkPtrReg 3500. |

FIG. 41

| Function |
|---|
| Clear History Stack Buffer - Setting this bit starts the Clear History Stack Buffer State Machine that causes the History Stack to clear the HstryStkPtr to zero and write entries 0 to 255 (ascending order) of the Address Control and Data History Stack Buffers to zero. When the History module 234 completes this operation the HstryStkPtr is pointing at entry zero. |

| Function |
|---|
| Record Access Error (RcrdAccErrReg) - Set by History module 234 when a Memory Mapped register read or write access to History module 234 is detected while in Record Mode. This remains set until a Clear Enable Record and Status write access (set to zero) is sent to the History Module 234. |
| Set Enable Record (EnRcrdReg) - Setting this bit (Set Enable Record) allows the History module 234 to start recording. Clearing this bit (Clear Enable Record and Status) stops History module 234 from making entries. |

| Function |
|---|
| DSP_Pause (read only) - When this bit is set the DSP 229 is in "sleep mode". This bit is a copy of the DSP_PauseReg. |
| DSPHSBPInt - DSP History Stack Break Point. When this bit is set (one cycle pulse) History module 234 detected a Break Point condition and stopped recording DSPAHB Bus 233 transactions. Setting this bit generates a level sensitive interrupt (DSPARMINT) to MP 240 (Interrupt Controller Module 207). |
| DSPARMWDTInt - When this bit is set the DSP Watchdog Timer expired. Setting this bit generates a level sensitive interrupt (DSPARMINT) to MP 240. |
| ARMSmphCflt - When DSPIM 210 sets this bit the PADREXCPT signal is asserted to APB Bridge 235 indicating that MP 240 attempted a register write (any register other than the APBDSPIMSmphrReg or this register) when DSP 229 had ownership of the DSPIMHdwSmphr bit. |
| ARMAdrExcpt - DSPIM 210 sets this bit (one clock cycle pulse) when an "address exception" has been detected during MP 240 access over APB Bus 208. |
| DSPARMTOARMInt - DSP 229 sets (one clock cycle pulse) this bit when a message or informatin has been prepared and is available for MP 240 to read. DSP 229 sets this bit indirectly by executing a write transaction to the DSPARMSndInt address. Setting this bit generates a level sensitive interrupt (DSPARMINT) to MP 240 (Interrupt Controller Module 207). |

*FIG. 48*

| Function |
|---|
| DSPARMSmphCflt - DSPIM 210 sets (one clock cycle pulse) this bit when the DSP 229 attempts a register write (any register except DSPIMSmphrReg and this register) when MP 240 has ownership of DSPIMSmphrReg[00], the hardware semaphore bit, DSPIMHdwSmphr. Setting this bit generates a two cycle Error Response to the DSP 229. |
| DSPARMAdrExcpt - DSPIM 210 sets this bit (one clock cycle pulse) when an "address exception" has been detected during a DSP 229 access over the DSPAHB Bus. DSPIM 210 returns a two cycle Error Response to DSP 229. |
| ARMDSPInt - MP 240 sets this bit (one clock cycle pulse) when a message or information has been prepared and is available for DSP 229 to read. MP 240 sets this bit indirectly by executing a write transaction to the ARMSndInt address. Setting this bit generates a level sensitive interrupt |

FIG. 49

| Function |
|---|
| DSPIMSftSmphr - DSPIM 210 Soft Semaphores that provide procedural interlocks used by the firmware. |
| DSPIMHdwSmphr - DSPIM 210 Hardware Semaphores that provides hardware interlock. When MP 240 acquires the semaphore DSP 229 cannot execute a write access to any register in DSPIM 210 except the Semaphore Register or its respective status register. The reverse is the case when the DSP 229 owns this semaphore. |

*FIG. 51*

| Function |
|---|
| EnTCMIndAcc - Enables Indirect Access to Memory Module 212. |
| TCMIndWrtCtrl - Memory Module 212 Indirect Write Control when set allows indirect write access. If this bit is clear, indirect access is for read only. |
| TCMIndRdCont - When set allows indirect read access to continue to fill the memory module 212 Read FIFO when an entry is available. |
| TCMFIFOFull - When set memory module 212 FIFO is full (read only). |
| TCMFIFOEmpty - When set the memory module 212 FIFO is empty (read only). |
| TCMIndAdr - Memory module 212 Indirect Address. |

*FIG. 52* ical data to analog head signals, disk formatting, error checking and fixing, logical to physical address mapping and data buffering. To perform the various functions for transferring data, the disk controller includes numerous components.

METHOD AND SYSTEM FOR USING AN EXTERNAL BUS CONTROLLER IN EMBEDDED DISK CONTROLLERS

CROSS REFERENCE TO RELATED APPLICATIONS

This application is related to the following U.S. patent applications assigned to the same assignee, filed on even date herewith and incorporated herein by reference in their entirety:

"METHOD AND SYSTEM FOR SUPPORTING MULTIPLE EXTERNAL SERIAL PORT DEVICES USING A SERIAL PORT CONTROLLER IN AN EMBEDDED DISK CONTROLLER", U.S. Ser. No. 10/385,039, with MICHAEL R. SPAUR and IHN KIM as inventors.

"METHOD AND SYSTEM FOR AUTOMATIC TIME BASE ADJUSTMENT FOR DISK DRIVE SERVO CONTROLLERS", U.S. Ser. No. 10/384,992, with MICHAEL R. SPAUR and RAYMOND A. SANDOVAL as inventors.

"METHOD AND SYSTEM FOR EMBEDDED DISK CONTROLLERS", U.S. Ser. No. 10/385,022, with LARRY L. BYERS, PAUL B. RICCI, JOSEPH G. KRISCUNAS, JOSEBA M. DESUBIJANA, GARY R. ROBECK, DAVID M. PURDHAM and MICHAEL R. SPAUR as inventors.

"METHOD AND SYSTEM FOR USING AN INTERRUPT CONTROLLER IN EMBEDDED DISK CONTROLLERS", Ser. No. 10/384,991, with DAVID M. PURDHAM, LARRY L. BYERS and ANDREW ARTZ as inventors.

"METHOD AND SYSTEM FOR MONITORING EMBEDDED DISK CONTROLLER COMPONENTS", Ser. No. 10/385,042, with LARRY L. BYERS, JOSEBA M. DESUBIJANA, GARY R. ROBECK, and WILLIAM W. DENNIN as inventors.

"METHOD AND SYSTEM FOR COLLECTING SERVO FIELD DATA FROM PROGRAMMABLE DEVICES IN EMBEDDED DISK CONTROLLERS", Ser. No. 10/385,405, with MICHAEL R. SPAUR and RAYMOND A. SANDOVAL as inventors.

BACKGROUND OF THE INVENTION

1. Field of the Invention

The present invention relates generally to disk controllers, and more particularly to an embedded disk controller that includes a hard disk controller, a microprocessor, a digital signal processor, and a servo controller.

2. Background

Conventional computer systems typically include several functional components. These components may include a central processing unit (CPU), main memory, input/output ("I/O") devices, and disk drives. In conventional systems, the main memory is coupled to the CPU via a system bus or a local memory bus. The main memory is used to provide the CPU access to data and/or program information that is stored in main memory at execution time. Typically, the main memory is composed of random access memory (RAM) circuits. A computer system with the CPU and main memory is often referred to as a host system.

The main memory is typically smaller than disk drives and may be volatile. Programming data is often stored on the disk drive and read into main memory as needed. The disk drives are coupled to the host system via a disk controller that handles complex details of interfacing the disk drives to the host system. Communications between the host system and the disk controller is usually provided using one of a variety of standard I/O bus interfaces.

Typically, a disk drive includes one or more magnetic disks. Each disk typically has a number of concentric rings or tracks on which data is stored. The tracks themselves may be divided into sectors, which are the smallest accessible data units. A positioning head above the appropriate track accesses a sector. An index pulse typically identifies the first sector of a track. The start of each sector is identified with a sector pulse. Typically, the disk drive waits until a desired sector rotates beneath the head before proceeding for a read or write operation. Data is accessed serially, one bit at a time and typically, each disk has its own read/write head.

The disk drive is connected to the disk controller that performs numerous functions, for example, converting digital data to analog head signals, disk formatting, error checking and fixing, logical to physical address mapping and data buffering. To perform the various functions for transferring data, the disk controller includes numerous components.

Typically, the data buffering function is used to transfer data between the host and the disk. Data buffering is needed because the speed at which the disk drive can supply data or accept data from the host is different than the speed at which the host can correspondingly read or supply data. Conventional systems include a buffer memory that is coupled to the disk controller. The buffer memory temporarily stores data that is being read from or written to the disk drive.

Conventionally, when data is read from the disk drive, a host system sends a read command to the disk controller, which stores the read command into the buffer memory. Data is read from the disk drive and stored in the buffer memory. An ECC module determines the errors that occur in the data and appropriately corrects those errors in the buffer memory. Once it is determined that there are no errors, data is transferred from the buffer memory to the host system.

Conventional disk controllers do not have an embedded processor or specific modules that can efficiently perform the complex functions expected from disk controllers.

Conventional disk controllers cannot access plural external memory having different timing characteristics. In addition, conventional controllers do not easily permit use of different bus data width to which external memory is coupled.

Conventional disk controllers do not have a built in module that can track bus activity and hence provide valuable information for de-bugging. In conventional disk controllers, the disk controller must be coupled to an external bus analyzer to debug and/or monitor bus activity. This process is cumbersome and requires additional pins on the disk controller. In addition, conventional monitoring techniques cannot easily isolate components within the disk controller that need to be monitored.

Conventional disk controllers do not have a dedicated module that controls, prioritizes and generates interrupts.

Therefore, what is desired is an embedded disk controller system that can efficiently function in the fast paced, media storage environment.

SUMMARY OF THE INVENTION

In one aspect of the present invention, a system for an embedded disk controller is provided. The system includes a first main processor operationally coupled to a high performance bus and a second processor operationally coupled to a peripheral bus. The system further includes an external bus interface controller ("EBC") for managing devices external to the system via an external bus interface, wherein the EBC is coupled to the high performance bus and includes at least a segment descriptor register and at least a device range register. The segment descriptor register allows firmware to program timing characteristics of the devices. The device range register enables the first main processor to access an address space in the devices.

In another aspect of the present invention, a method for controlling devices external to an embedded disk controller with a first main processor operationally coupled to a high performance bus and a second processor operationally coupled to a peripheral bus is provided. The method includes receiving an input signal; determining the external device's timing characteristics and device range that is a target for a read or write cycle; and asserting a write enable or read enable signal based on the input signal.

In yet another aspect of the present invention, the system with an external bus interface controller ("EBC") for managing devices external to an embedded disk controller is provided. The system includes a state machine logic with a first idle state until a valid input signal is received; a first decoding stage for decoding an address to determine which external device is a target for a read or write cycle; a second decoding stage that avoids data extension on an external bus; and a chip select signal stage during which an output signal is generated.

In one aspect of the present invention, the main processor in an embedded disk controller can access multiple devices with different timing characteristics or data width.

This brief summary has been provided so that the nature of the invention may be understood quickly. A more complete understanding of the invention can be obtained by reference to the following detailed description of the preferred embodiments thereof in connection with the attached drawings.

BRIEF DESCRIPTION OF THE DRAWINGS

The foregoing features and other features of the present invention will now be described. In the drawings, the same components have the same reference numerals. The illustrated embodiment is intended to illustrate, but not to limit the invention. The drawings include the following Figures:

FIGS. 4A, 4B and 4C (referred herein as FIG. 4) show a table with various input signals to the external bus controller, according to one aspect of the present invention;

FIGS. 5A–5C (referred herein as FIG. 5) show a table with various output signals from the external bus controller, according to one aspect of the present invention;

FIGS. 7–9 show various registers with plural fields that are used by the external bus controller, according to one aspect of the present invention;

FIGS. 17A–17B (referred herein as FIG. 17) show a table with various input signals to the interrupt controller, according to one aspect of the present invention;

FIG. 18 is a table showing various output signals from the interrupt controller, according to one aspect of the present invention;

FIG. 19 is a table showing a register map used by the interrupt controller, according to one aspect of the present invention;

FIGS. 20–26 show various registers with various fields that are used by the interrupt controller, according to one aspect of the present invention;

FIGS. 32A-1 to 32A-4 show a table with various input signals to the history module, according to one aspect of the present invention;

FIG. 32B is a table showing various output signals from the history module, according to one aspect of the present invention;

FIGS. 33–43 show various registers with various fields that are used by the history module, according to one aspect of the present invention;

FIGS. 46–49 show various registers with various fields that are used as "mail boxes", according to one aspect of the present invention;

FIGS. 51–53 show various registers with various fields that are used for indirect access of a memory module, according to one aspect of the present invention.

DETAILED DESCRIPTION OF THE PREFERRED EMBODIMENTS

To facilitate an understanding of the preferred embodiment, the general architecture and operation of a disk controller will be described initially. The specific architecture and operation of the preferred embodiment will then be described.

Figure 1:
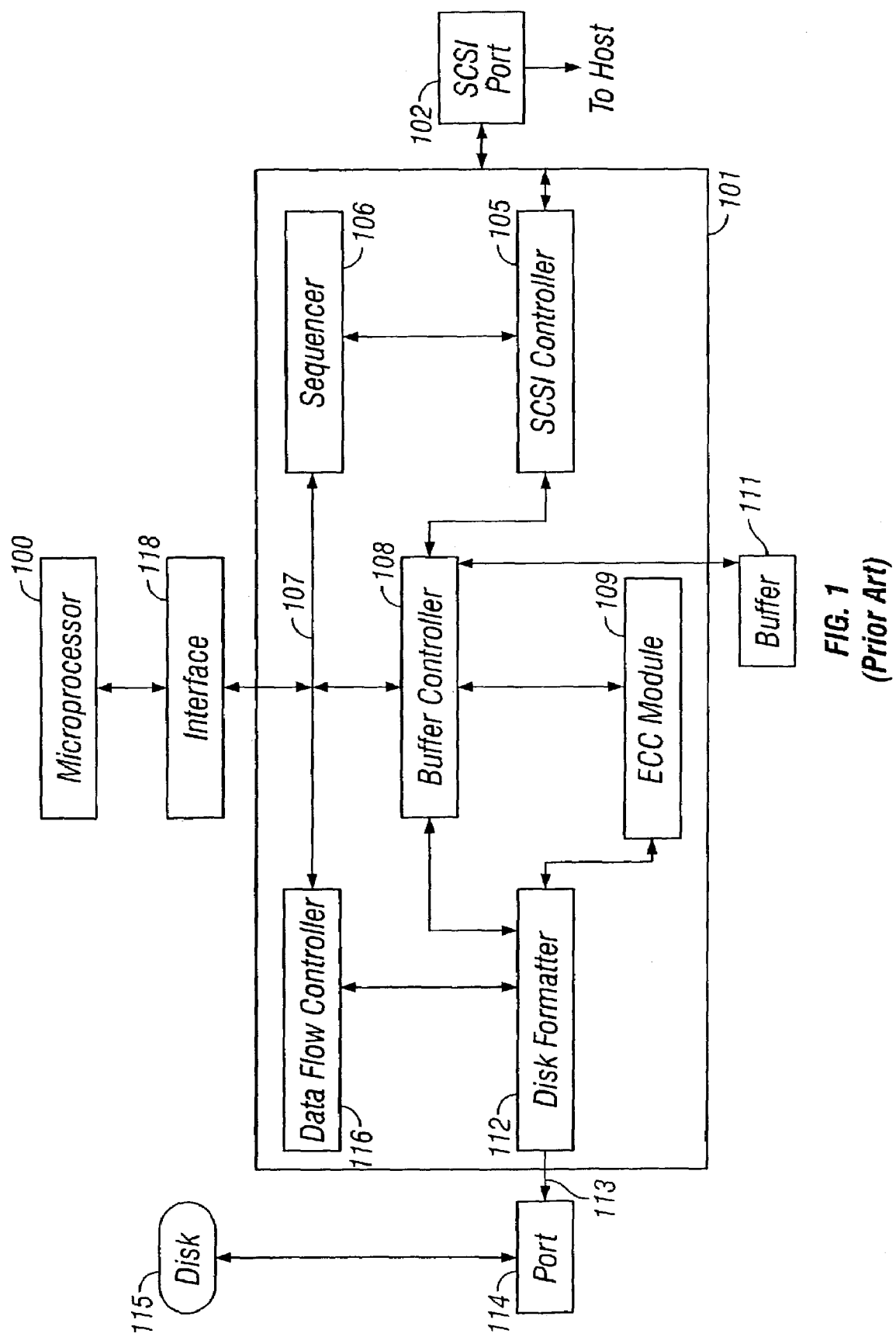
FIG. 1 is a block diagram of a hard disk controller in the prior art.

The disk drive system of FIG. 1 is an example of an internal (hard) disk drive included in a computer system system. The host computer (not shown) and the disk drive communicate via port 102, which is connected to a data bus (not shown). In an alternate embodiment (not shown), the disk drive is an external storage device, which is connected to the host computer via a data bus. The data bus, for example, is a bus in accordance with a Small Computer System Interface (SCSI) specification. Those skilled in the art will appreciate that other communication buses known in the art can be used to transfer data between the disk drive and the host system.

As shown in FIG. 1, the disk drive includes disk controller 101, which is coupled to SCSI port 102, disk port 114, buffer memory 111 and microprocessor 100. Interface 118 serves to couple microprocessor bus 107 to microprocessor 100. It is noteworthy that microprocessor 100 is not on the same chip as disk controller 101. A read only memory ("ROM") omitted from the drawing is used to store firmware code executed by microprocessor 100. Disk port 114 couples disk controller 101 to disk 115.

As is standard in the industry, data is stored on disk 115 in sectors. Each sector is byte structured and includes various fields, referred to as the sector format. A typical sector format includes a logical block address ("LBA") of about four bytes followed by a data field of about 512 bytes. The LBA contains position information, for example, cylinder, head and sector numbers. A field for a CRC checksum of 4 bytes typically follows the data field. A subsequent field for a number of ECC bytes, for example 40–80 bytes, is located at the end of the sector.

Controller 101 can be an integrated circuit (IC) (or application specific integrated circuit "ASIC") that comprises of various functional modules, which provide for the writing and reading of data stored on disk 115. Microprocessor 100 is coupled to controller 101 via interface 118 to facilitate transfer of data, address, timing and control information. Buffer memory 111 is coupled to controller 101 via ports to facilitate transfer of data, timing and address information.

Data flow controller 116 is connected to microprocessor bus 107 and to buffer controller 108. An ECC module 109 and disk formatter 112 are both connected to microprocessor bus 107. Disk formatter 112 is also coupled to data and control port 113 and to data bus 107.

SCSI controller 105 includes programmable registers and state machine sequencers that interface with SCSI port 102 on one side and to a fast, buffered direct memory access (DMA) channel on the other side.

Sequencer 106 supports customized SCSI sequences, for example, by means of a 256-location instruction memory that allows users to customize command automation features. Sequencer 106 is organized in accordance with the Harvard architecture, which has separate instruction and data memories. Sequencer 106 includes, for example, a 32-byte register file, a multi-level deep stack, an integer algorithmic logic unit (ALU) and other special purpose modules. Sequencer 106 support's firmware and hardware interrupts schemes. The firmware interrupt allows microprocessor 100 to initiate an operation within Sequencer 106 without stopping sequencer operation. Hardware interrupt comes directly from SCSI controller 105.

Disk formatter 112 is a disk interface controller and performs control operations when microprocessor 100 loads all required control information and parameter values into a writable control store (WCS) RAM (not shown) and issues a command. Disk formatter 112 executes the command with no microprocessor 100 intervention.

Buffer controller 108 can be a multi-channel, high speed DMA controller. Buffer controller 108 connects buffer memory 111 to disk formatter 112 and to an ECC channel of ECC module 109, a SCSI channel of SCSI controller 105 and micro-controller bus 107. Buffer controller 108 regulates data movement into and out of buffer memory 111.

To read data from disk 115, a host system sends a read command to disk controller 101, which stores the read commands in buffer memory 111. Microprocessor 100 then read the command out of buffer memory 111 and initializes the various functional blocks of disk controller 101. Data is read from disk 115 and is passed through disk formatter 112 simultaneously to buffer controller 108 and to ECC module 109. Thereafter, ECC module 109 provides the ECC mask for errors, which occurred during the read operation, while data is still in buffer controller 108. The error is corrected and corrected data is sent to buffer memory 111, and then passed to the host system.

Figure 2A:
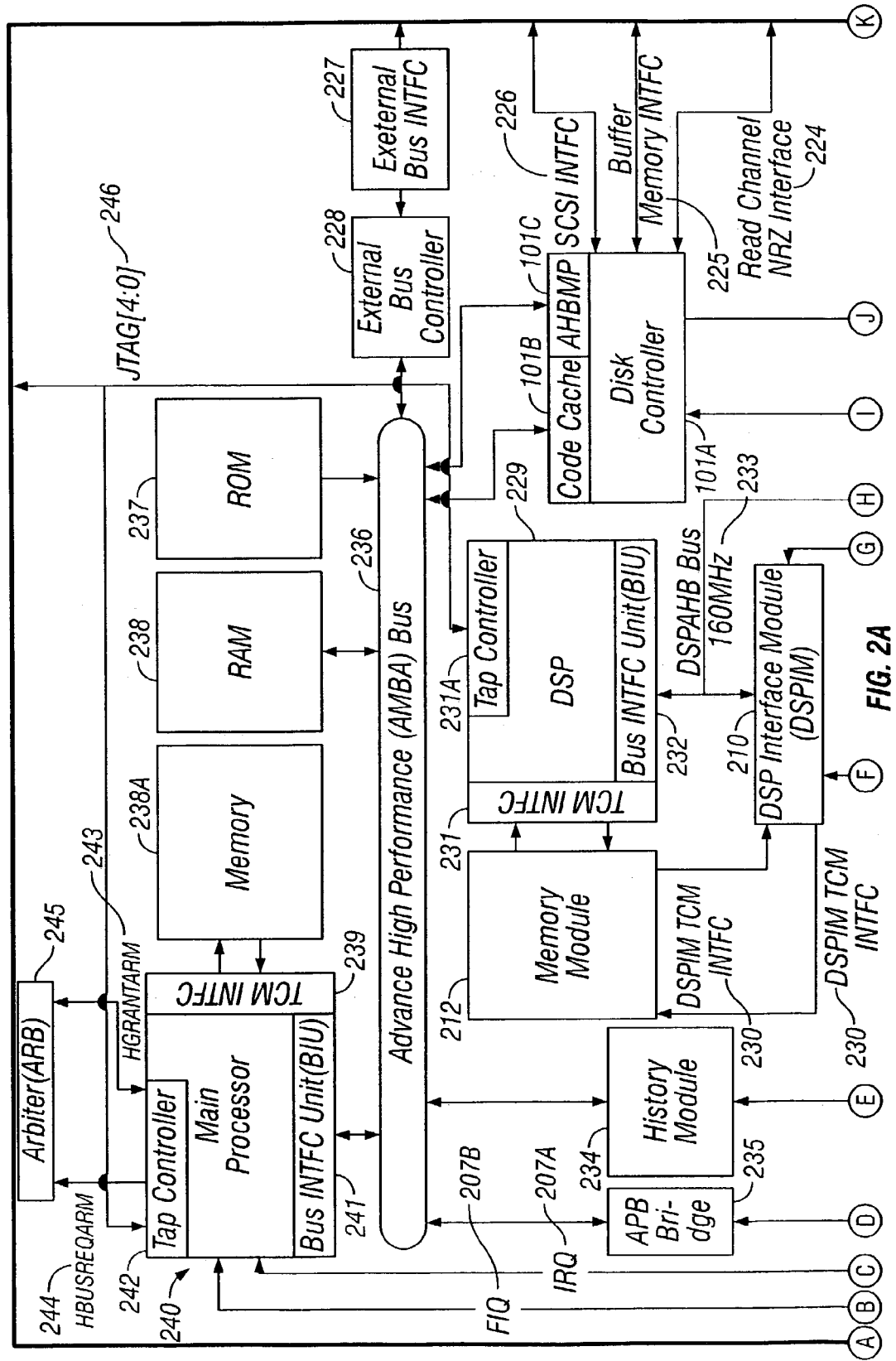
FIGS. 2A–2B (referred herein as FIG. 2) is a block diagram of an embedded disk controller, according to one aspect of the present invention.
Figure 2B:
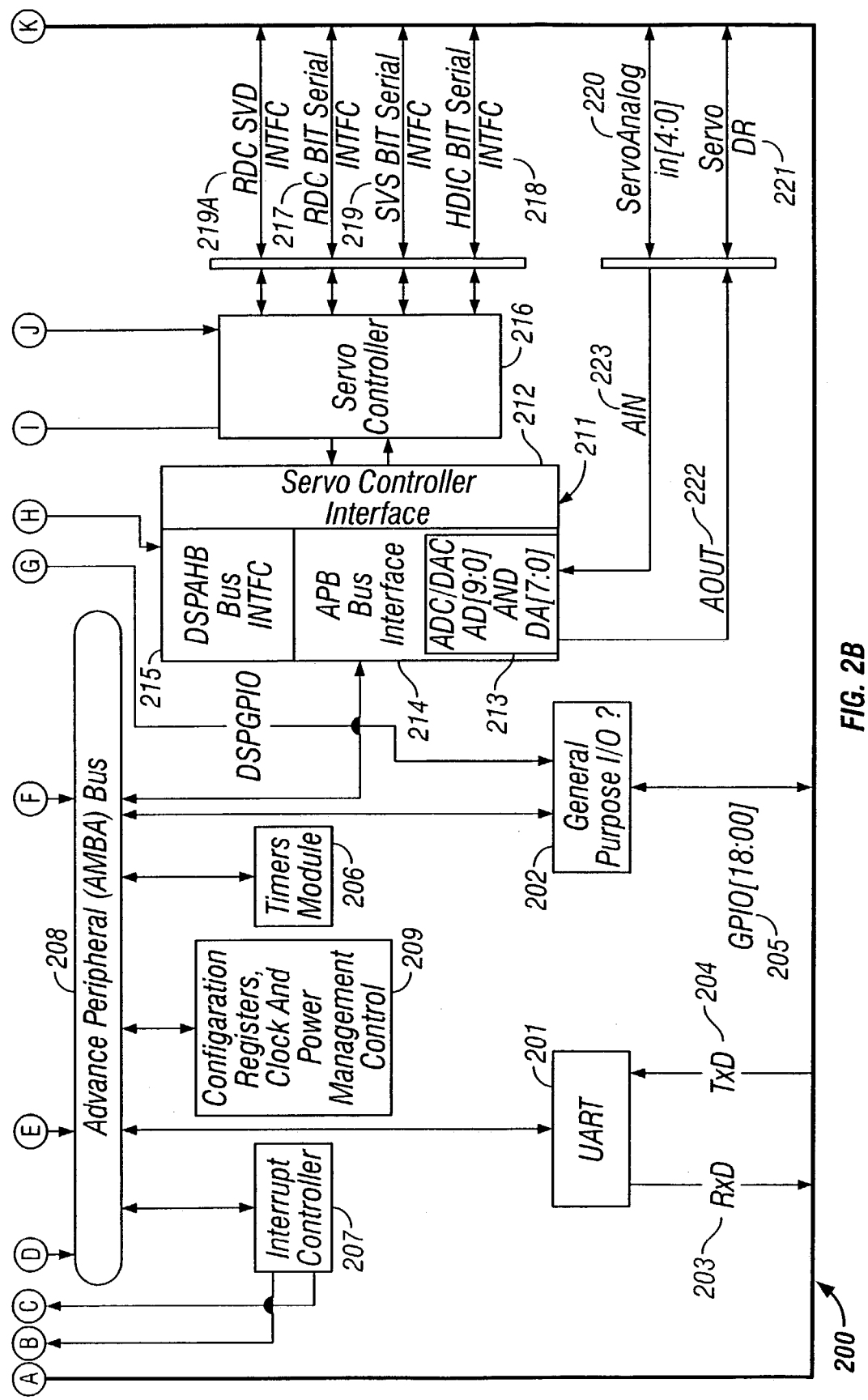

FIG. 2 shows a block diagram of an embedded disk controller system 200 according to one aspect of the present invention that not only includes the functionality of disk controller 101, but also includes various other features to meet the demands of storage industry. System 200 may be an application specific integrated circuit ("ASIC").

System 200 includes a microprocessor ("MP") 240 (which is also the overall system processor) that performs various functions described below. MP 240 may be a Pentium® Class processor designed and developed by Intel Corporation® or an ARM processor (for example, ARM966E-S®) or any other processor. MP 240 is operationally coupled to various system 200 components via buses 236 and 208. Bus 236 may be an Advanced High performance (AHB) bus as specified by ARM Inc. Bus 208 may an Advanced Peripheral Bus ("APB") as specified by ARM Inc. The specifications for AHB and APB are incorporated herein by reference in their entirety. It is noteworthy that the present invention is not limited to any particular bus or bus standard.

Arbiter 245 arbitrates access to AHB bus 236, while APB bridge 235 is used to communicate between buses 236 and 208.

System 200 is also provided with a random access memory (RAM) or static RAM (SRAM) 238 that stores programs and instructions, which allows MP 240 to execute computer instructions. MP 240 may execute code instructions (also referred to as "firmware") out of RAM 238.

System 200 is also provided with read only memory (ROM) 237 that stores invariant instructions, including basic input/output instructions.

MP 240 includes a TAP controller 242 that performs various de-bugging functions.

MP 240 is also coupled to an External Bus Interface Bridge (or Controller) ("EBC" also referred to as "EBI" or "EBI controller") 228 via an external bus interface ("EBI/F") 227. EBC 228 allows system 200 via MP 240 and EBI/F 227 to read and write data using an external bus, for example, a storage device external to system 200, including FLASH memory, read only memory and static RAM. EBC 228 may be used to control external memory (not shown), as discussed in detail below. EBI/F 227 may be programmed to interface with plural external devices.

System 200 includes an interrupt controller ("IC") 207 that can generate regular interrupts (IRQ 207A) or a fast interrupt (FIQ 207B) to MP 240. In one aspect of the present invention, IC 207 is an embedded system that can generate interrupts and arbitrates between plural interrupts. IC 207 is described below in detail.

System 200 includes a serial interface ("UART") 201 that receives information via channel 203 and transmits information via channel 204.

System 200 includes registers 209 that include configuration, system control, clock and power management information.

System 200 also includes an address break point and history module (also referred to as "history module" or "history stack") 234 that monitors activity on busses 236 and 208 and builds a history stack. Such history stack may be used for debugging, and monitoring plural components of system 200. History module 234 is discussed below in detail.

System 200 also includes a timer module 206 that controlled by MP 240 and includes various timers, for example, the "Watchdog timer".

System 200 is provided with a general purpose input/output ("GPIO") module 202 that allows GPIO access to external modules (not shown).

System 200 is also provided with a digital signal processor ("DSP") 229 that controls and monitors various servo functions through DSP interface module ("DSPIM") 210 and servo controller interface 212 operationally coupled to a servo controller 216.

DSPIM 109 interfaces DSP 229 with MP 240 and updates a tightly coupled memory module (TCM) 212 (also referred to as "memory module" 212) with servo related information. MP 240 can access TCM 212 via DSPIM 210.

Servo controller interface ("SCI")211 includes an APB interface 214 that allows SCI 211 to interface with APB bus 208 and allows SC 216 to interface with MP 240 and DSP 229. SCI 211 also includes DSPAHB interface 215 that allows access to DSPAHB bus 233. SCI 211 is provided with a digital to analog/analog to digital converter 213 that converts data from analog to digital domain and vice-versa. Analog data 223 enters module 213 and leaves as data 222 to a servo drive 221.

SC 212 has a read channel device (RDC) interface 217, a spindle motor control ("SVC") interface 219, a head integrated circuit(HDIC) interface 218 and servo data ("SVD") interface 219A.

System 200 also includes a hard disk controller 101A that is similar to the HDC 101 and includes a code cache 101B.

In one aspect of the present invention, because system 200 includes, dual embedded processors (MP 240 and DSP 229) with dedicated history module 234, IC module 207, servo controller and EBC 228, it can perform various functions independently. This not only saves the resources of MP 240 but also improves communication between a host and an external device.

In another aspect, embedded processors (MP 240 and DSP 229) provide independent real time control, with one processor as the system control processor (MP 240) and the second processor (DSP 229) as a slave to the first for real time control of the disk servo mechanism. DSP 229 as a slave also provides real time control for positioning a disk actuator. This includes analyzing error positioning data and outputting error correction data.

Dual processors also provide a real time overlap for processing host commands. For example, one processor may move the actuator while the other processor translates the LBA into physical information and queue host requests.

The dual processors also improve overall performance for the host. It also allows data recovery when ECC cannot correct data failures. Using unique data recovery algorithms and error recovery information data may be recovered if the ECC module 109 fails to dynamically correct the data.

The following describes the various components of system 200 in detail, according to various aspects of the present invention.

EBC 228

Figure 3:
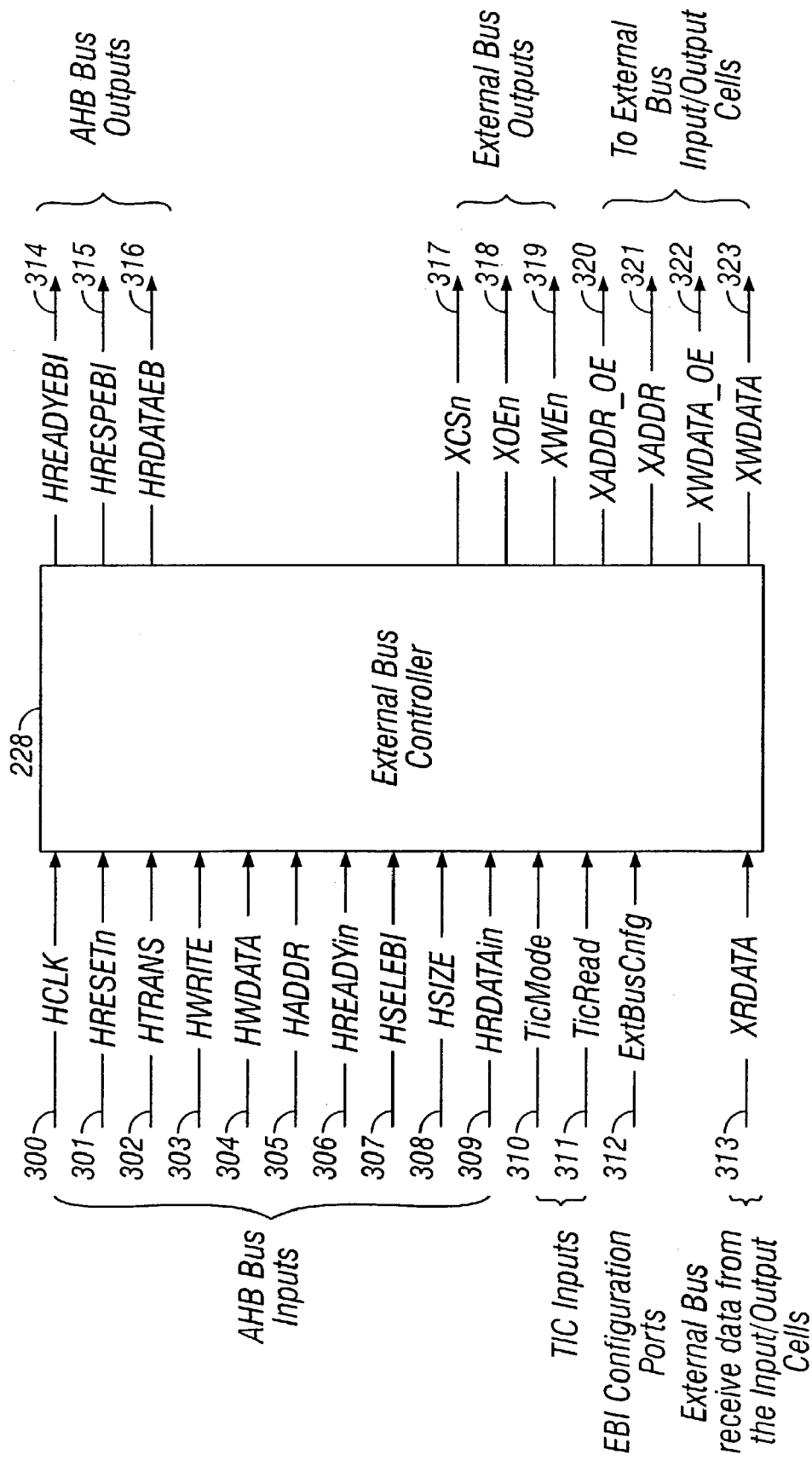
FIG. 3 is a block diagram of an external bus controller, according to one aspect of the present invention.

EBC 228 is a slave on AHB bus 236 and adapts the high performance of AHB bus 236 to a slower external bus (not shown) that can support external memory (including without limitation, flash memory, ROM, and static memory (not shown)). FIG. 3 shows a block diagram of EBC 228 with various input signals (300–313) and output signals (314–323). FIG. 4 provides a table describing signals 300–313 and FIG. 5 provides a table describing signals 314–323.

In one aspect of the present invention, MP 240 via EBC 228 may access multiple devices with different timing characteristics or data width. At least a Segment Descriptor register is provided, which specifies the timing characteristic of each external device. Also provided is at least a device range register, which specifies the size of the external device address space. Depending on the external bus data width, EBC 228 may convert AHB bus 236 transactions into multiple external bus transactions.

Figure 6:
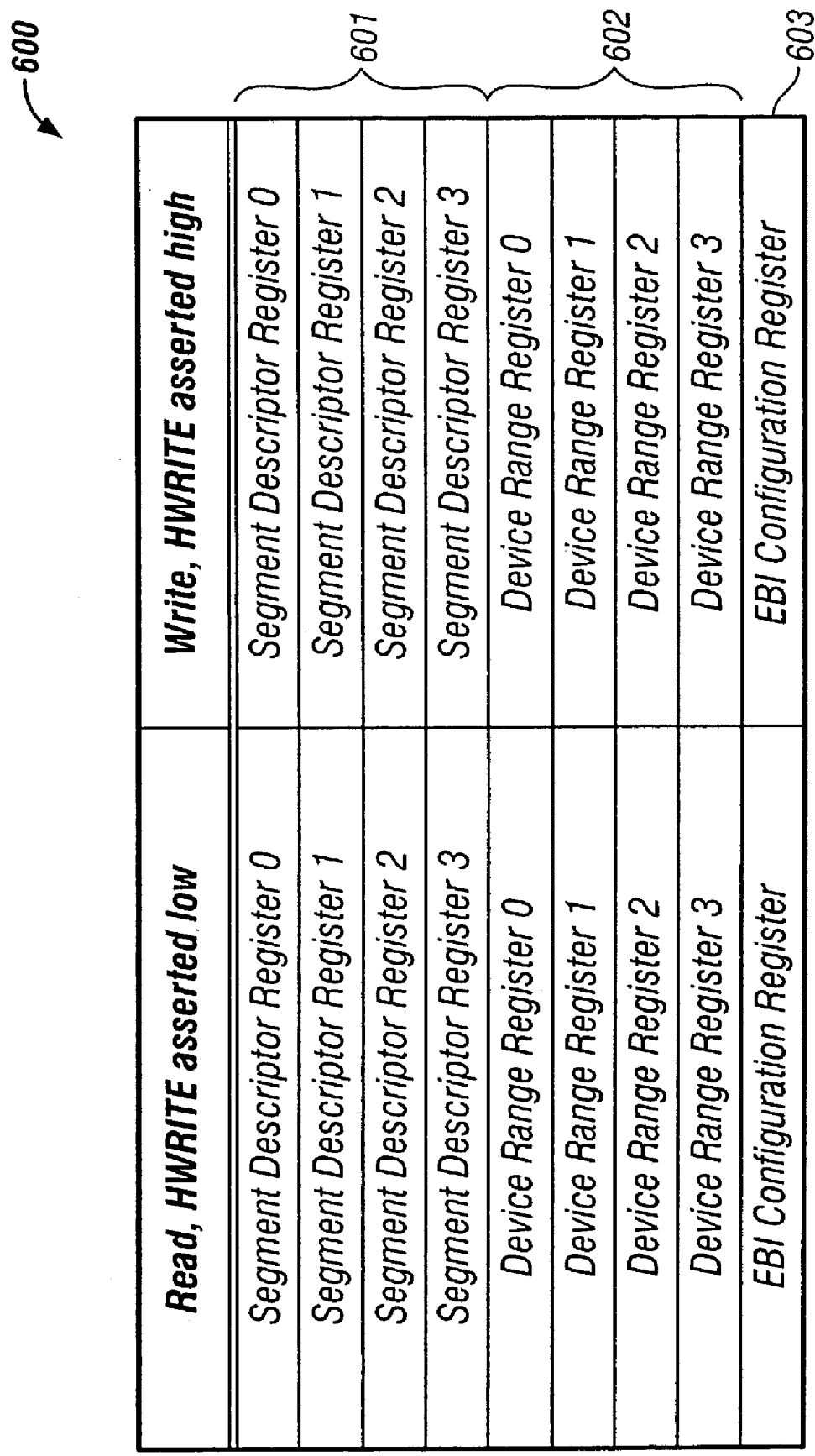
FIG. 6 is a table showing a register map used by the external bus controller, according to one aspect of the present invention.

FIG. 6 provides a register map 600 for EBC 228, according to one aspect of the present invention. Register map 600 includes segment descriptor registers 601, device range registers 602, and EBC 228 configuration register 603.

Each device segment descriptor register 601 may be formatted the same way with the same fields. Segment descriptor registers 601 allow firmware to program timing characteristics for an external memory device on an external memory bus. For example, as shown in the table of FIG. 6, four segment descriptor registers 601 may include timing intervals for four different devices. It is noteworthy that the example in FIG. 6 is only to illustrate the adaptive aspects of the present invention and not to limit the number of devices to just four. Any number of devices may be used.

FIG. 7 provides a description of the segment register 601 values. MP 240 writes the values in segment registers 601 during initialization. Register(s) 601 includes various values (601A–601G) that allow the firmware to program timing characteristics for an external memory device. Values include a Write Hold Wait State (WHW) 601A, Transaction Recovery Wait States 601B, Setup 2 Wait States (SW2) 601C, Setup 1 Wait States (SW1) 601D, Data Width (DW) 601E, Write Wait States (WW) 601F and Read Wait State (RW) 601G, as described in FIG. 7.

DW 601E specifies the data width of an external bus device (not shown). A state machine may be used by EBC 228 to use the various register 601 values, as shown by the state machine diagram in FIG. 15 and discussed below. It is noteworthy that the invention is not limited to the command terminology of FIG. 7.

FIG. 8 provides a description of device range registers 602. An enable ("EN") bit 602A is set to access the address range of a device, while the device range (DvRng) 602B specifies the number of blocks that may be addressed within the device address space. MP 240 to allow access to the address space within a particular device address initializes device range register 602.

FIG. 9 shows the plural fields (603A and 603B) used for configuring EBC 228. Device allocation bit 603B specifies the number of devices allocated on the external bus (not shown) and field 603A is used to read the external bus width as supported by EBC 228.

Figure 14:
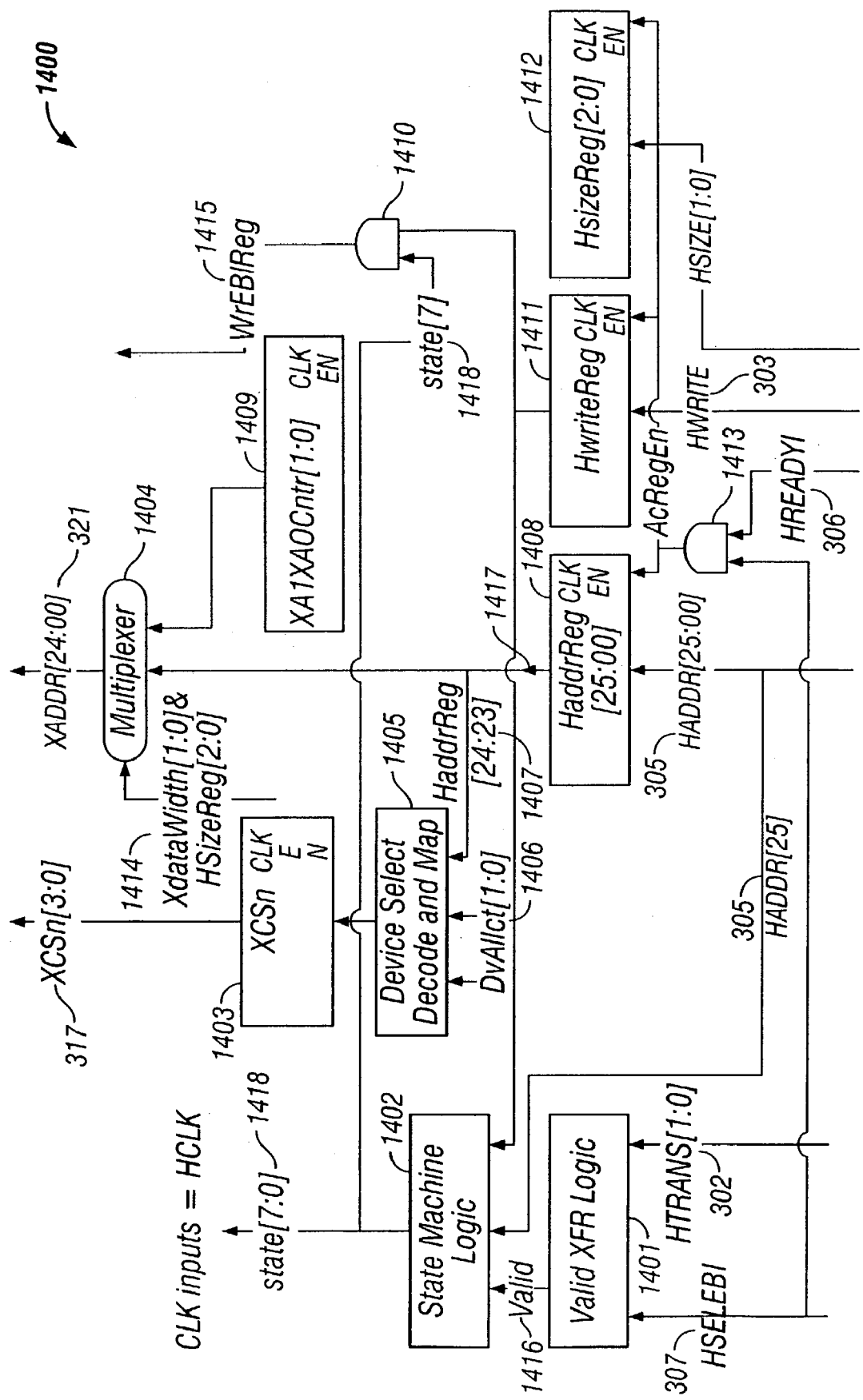
FIG. 14 is a functional block diagram of the external bus controller, according to one aspect of the present invention.

FIG. 14 shows a functional block diagram of system 1400 used in EBC 228 for supporting plural external devices. Input signals 302 and 307 from AHB bus 236 are sent to a validation module 1401 that validates the incoming signals. A valid signal is then sent to state machine logic 1402.

System 1400 includes a set of registers, for example, HaddrReg 1408, HwriteReg 1411 and HsizeReg 1412 register and their usage is described below.

Figure 15:
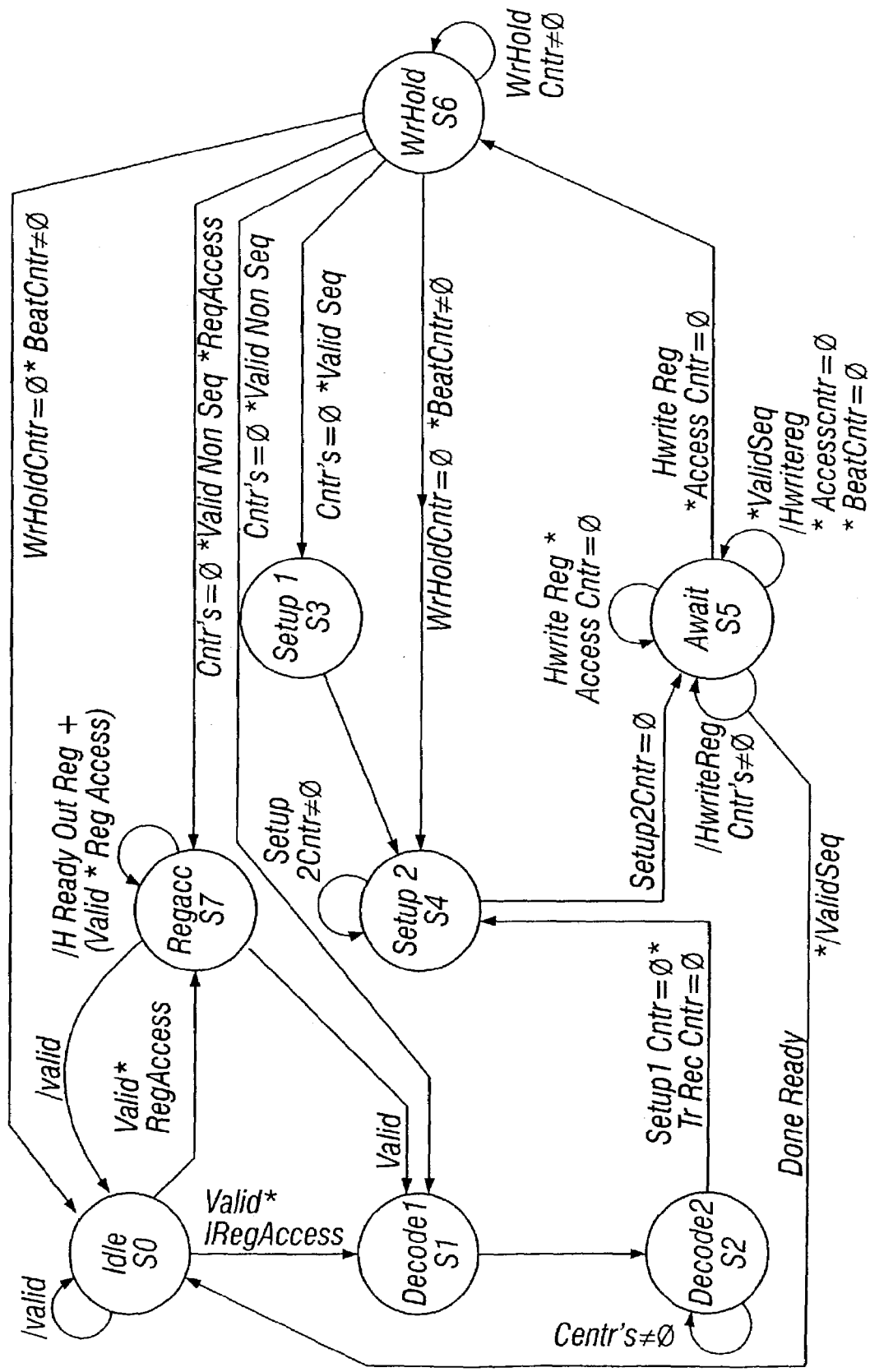
FIG. 15 is a state machine diagram of the external bus controller, according to one aspect of the present invention.

FIG. 15 shows a state machine diagram of process steps used by state machine logic 1402. The following provides a description of the plural states used by state machine logic 1402 to implement the adaptive aspects of the present invention.

State S0: This is an idle state, until a valid operation on the bus is received.

State S1: This is a first stage for decoding an address in HaddreReg 1408 to determine which external device if any, is the target for a read or write cycle. After determining the target external device, various counter values, as shown in FIG. 15, are loaded during this state.

State S2: This is a second state during which state machine 1402 remains in this stage until the SW1 601D and TRW 601B values expire to avoid data contention on the external bus.

State S3: The state machine stays in this state for at least one clock cycle with all external bus controls as being inactive. This state is only used for sequential write operations.

State S4: During this state the appropriate chip select signal (XCS 317) is asserted while the write enable (XWEn 319) or output enable (XOEn 318) are deasserted, until SW2 601C expires.

State S5: The state machine logic 1402 stays in this state until a current read or write operation is completed. During this state the chip select, write enable or out enable signals are asserted. For write commands, EBC 228 writes data and for read operation, EBC 228 reads data.

State S6: This state is entered only during write operations and is used to provide write data hold time. During this state, EBC 228 continues to drive the write data on the external bus while it keeps the write enable signal de-asserted.

State S7: During this state, registers within EBC 228 are read or written.

The relationship between the various states is shown in FIG. 15.

Figure 10:
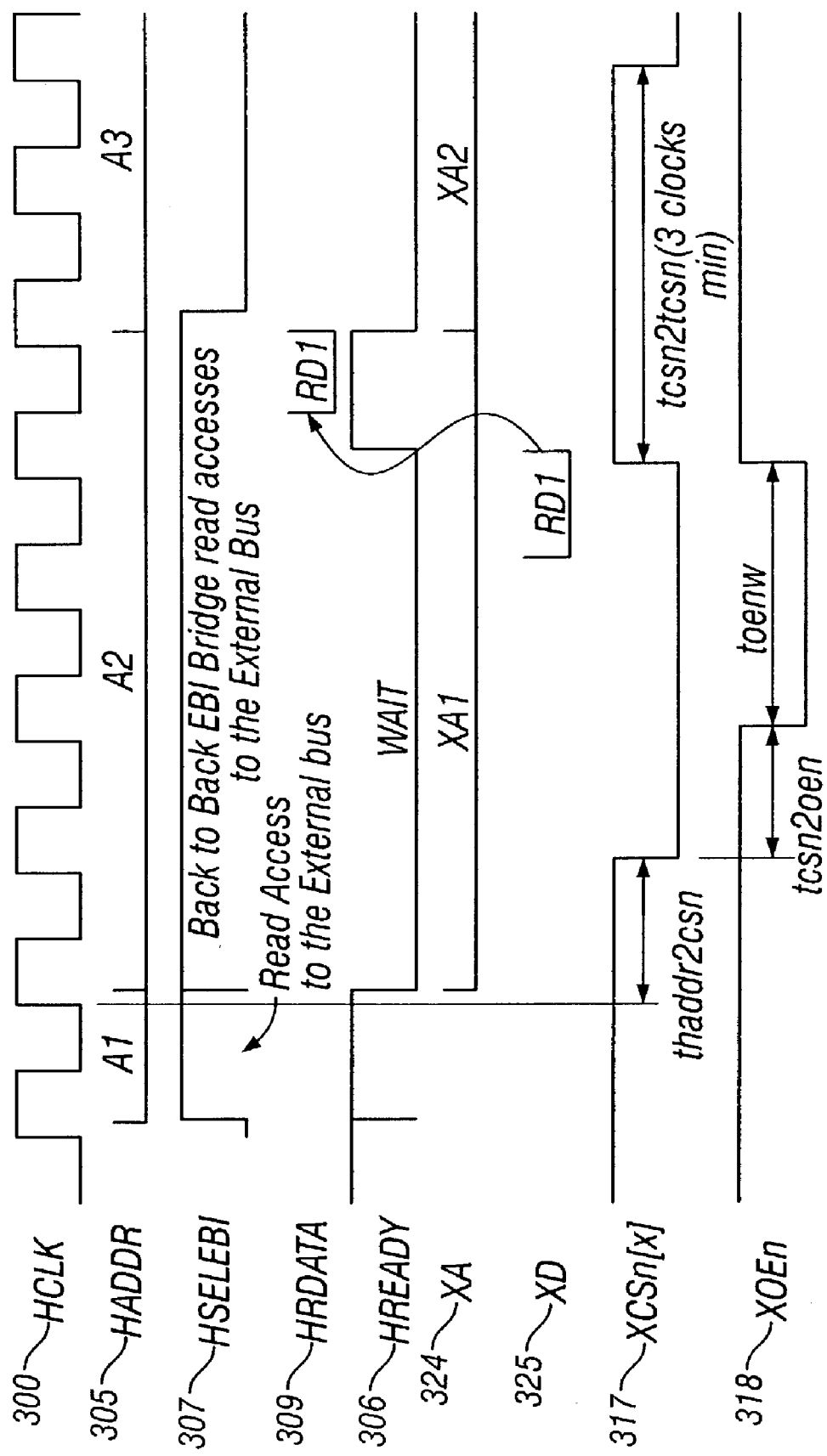
FIGS. 10–13 show various timing diagrams for the external bus controller, according to one aspect of the present invention.

FIGS. 10–3 show various timing diagrams using input signals 300–313 and output signals 314–323 with respect to the functional block diagram of system 1400 and the state diagram of FIG. 15.

FIG. 10 shows a diagram for a half word read access to a 16 bit external bus.

Figure 11:
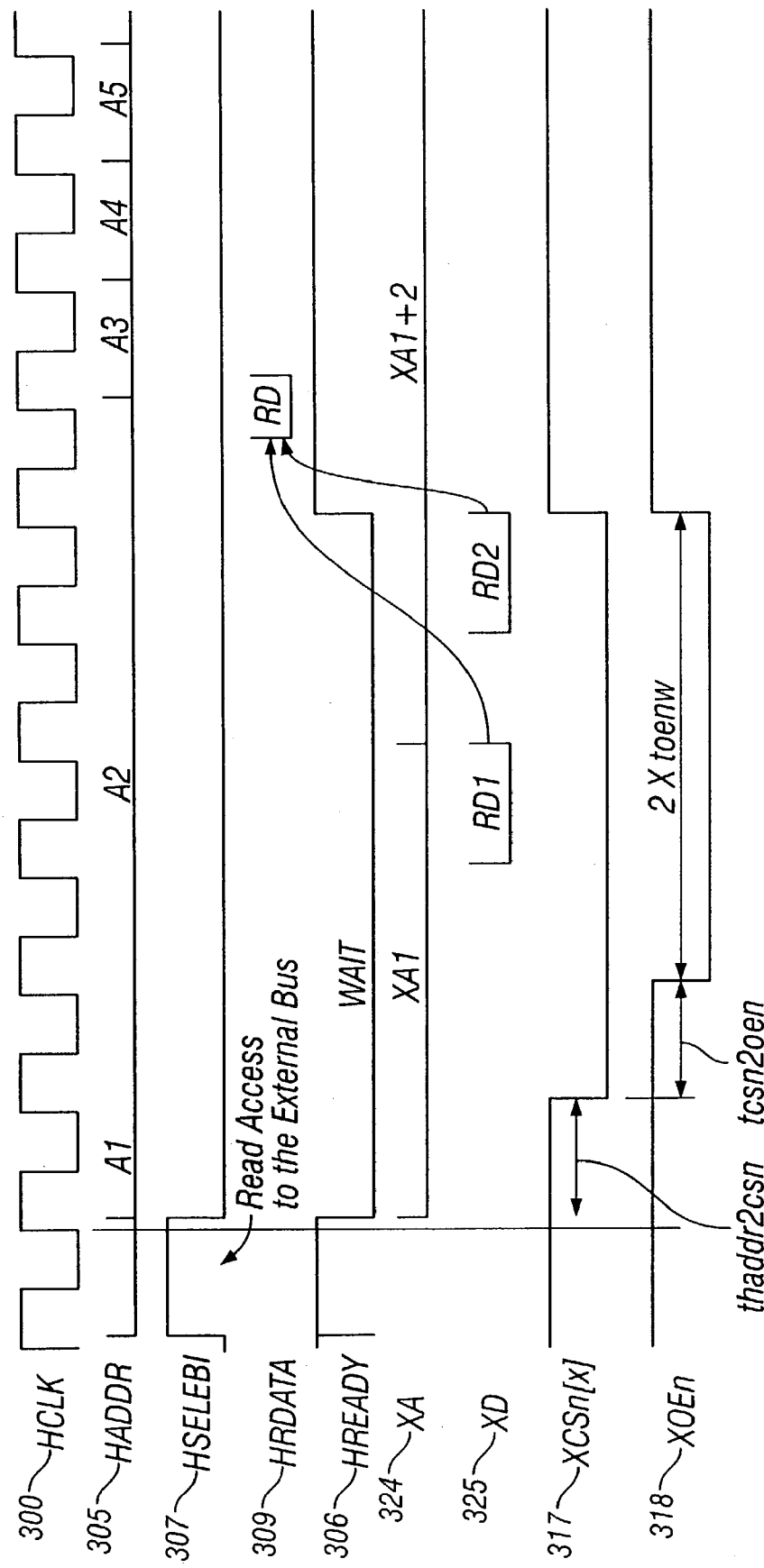

FIG. 11 shows a diagram for a word read access to a 16 bit external bus.

Figure 12:
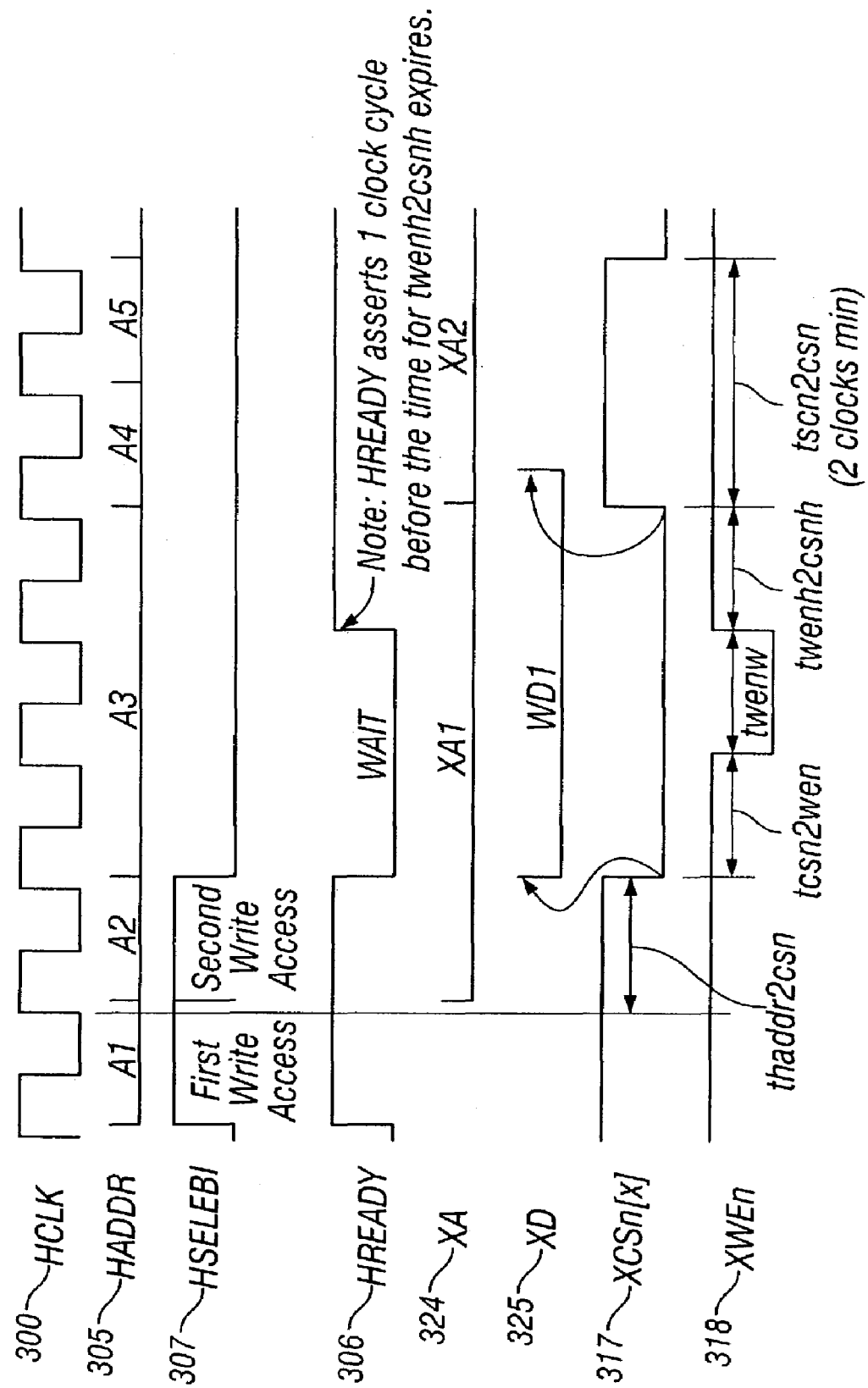

FIG. 12 shows a diagram for a half word write access to a 16 bit external bus.

Figure 13:
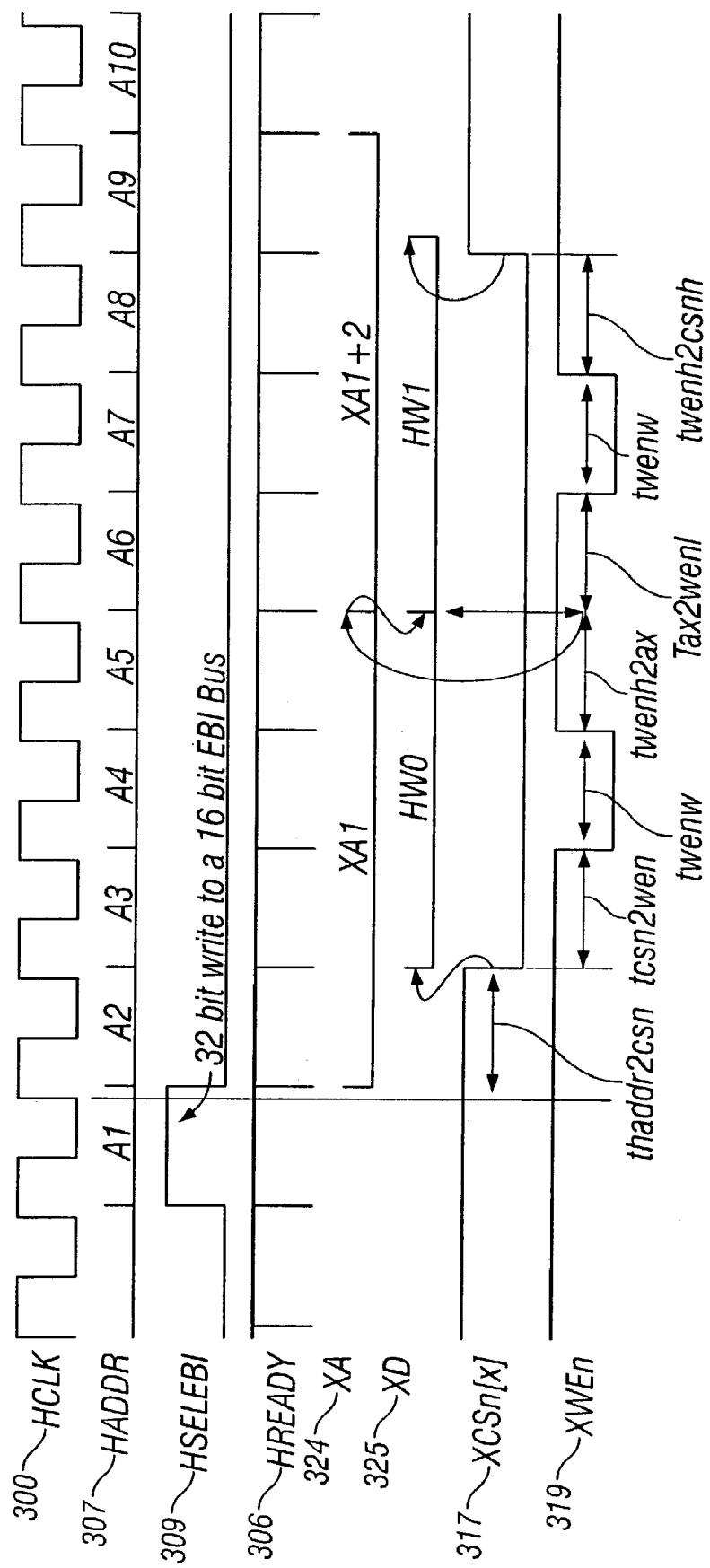

FIG. 13 shows a diagram for a word write access to a 16 bit external bus.

Interrupt Controller ("IC") 207:

IC 207 synchronizes and prioritizes interrupt signals as a slave on the APB bus 208. IC 207 handles two types of interrupts, Fast Interrupt Request ("FIQ") and Interrupt Request ("IRQ"). The interrupts are sent to MP 240. The FIQ 207B is used for critical interrupts as defined by a user or firmware. IRQs 207A are provided for routine interrupts. IC 207 provides the interrupts to MP 240 that interrogates IC 207 to retrieve a particular interrupt with an interrupt vector, as described below. MP 240 may clear, the interrupt after retrieving the interrupt information.

In one aspect of the present invention, IC module 207, provides FIQ 207B for critical interrupts, scans interrupts for priority, prevents interrupt source lockout (interlock) in the interrupt service and allows a user to change various interrupt options using firmware.

Figure 16:
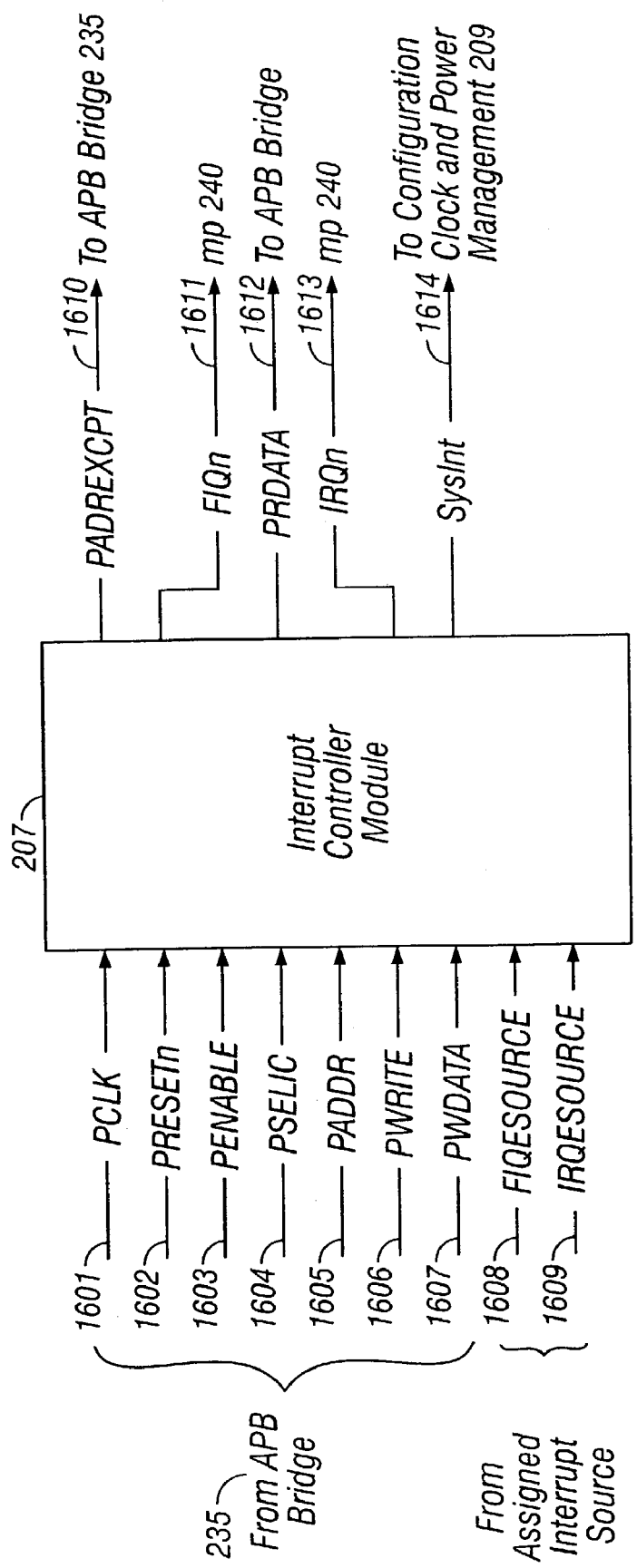
FIG. 16 is a block diagram of an interrupt controller, according to one aspect of the present invention.

FIG. 16 shows IC 207 with various input signals (1601–1609) and output signals (1610–1614). FIG. 17 and 18 provide a description of signals 1601–1609 and 1610–1614, respectively.

IC module 207 uses plural registers for controlling interrupts. The base address of IC module 207 is specified in APB Bridge 235. When signal PSELIC 1604 from APB bridge 235 is sent to IC module 207, the base address of IC module 207 is detected by APB bridge 235 and IC module 207 decodes signals PADDR 1605 and PWRITE 1606 to select the appropriate register address. IC module 207 examines signal PADDR 1605 for exceptions. An access to an undefined or reserved register address results in IC module 207 asserting the PADREXCPT signal 1610 to APB Bridge 235. It is noteworthy that this does not change the state of IC module 207. Also, access to an undefined "read" address results in PADREXCPT signal 1610 to APB Bridge 235.

FIG. 19 shows a register map 1900 for IC module 207. Register map 1900 includes a set of registers 1901 for IRQ control and a register 1904 for FIQ control. Register 1902 stores a current FIQ interrupt and register 1903 is used to mask/unmask FIQ ability, via firmware.

FIG. 20 shows details of register 1905 that provides status for an IRQ interrupt. Register 1905 includes field 1905A value for IRQValid. When the bit value for IRQValid is valid (for example, 1) then it indicates that IC module 207 has resolved an IRQ interrupt and the Vector Address field 1905B is valid.

FIG. 21 shows details of register 1903 that allows firmware to mask the Interrupt ability. FIQ interrupt ability may be enabled or disabled by setting up FIQInt Mask field 1903B. In addition, by setting field 1903A, IRQ interrupt sources may be masked.

FIG. 22 shows details of various fields used in register 1904, which is an interrupt control register for FIQ source. MK-Read only field 1904A is a copy of the mask bit from register 1903. Interrupt Request Sent ("IRS")-Read Only field 1904B is set when MP 240 reads the corresponding interrupt source as the prioritized interrupt from register 1902.

Interrupt Request Pending ("IRP")-Read Only field 1904C is set when a corresponding interrupt source is asserted. When IRS 1904B is set, IRP 1904C is cleared. In addition, when the source interrupt is masked, IRP 1904C may be cleared. Polarity ("PLR") 1904D is used to specify the polarity of an interrupt source.

Register 1904 also includes a trigger mode TM value 1904E that specifies the mode of an interrupt source signal. Field 1904E specifies whether the interrupt signal is edge triggered or level sensitive. Use of TM 1904E in register 1904 is discussed below in detail.

FIG. 23 provides various fields that are used in IRQ control register(s) 1901, which are interrupt control registers for IRQ sources. MK-Read only fields 1901A and 1901G are copies of the mask bits from register 1903. Interrupt Request Sent ("IRS")-Read Only fields 1901B and 1901I are set when MP 240 reads the corresponding interrupt source as the prioritized interrupt from register 1905. Interrupt Request Pending ("IRP")-Read Only fields 1901C and 1901H are set when a corresponding interrupt source is asserted. When IRS 1901B or 1901I are set, IRP 1901C or 1901H are cleared respectively. In addition, when the source interrupt is masked, IRP 1901C and 1901H may be cleared. Polarity ("PLR") 1901D and 1901J are used to specify the polarity of the corresponding interrupt sources. Register(s) 1901 also include trigger mode TM values 1901E and 1901K that specify the mode of the interrupt source signals.

Field 1901E and 1901K specify whether the interrupt signal is edge triggered or level sensitive. Use of TM 1901E and 1901K in register(s) 1901 is discussed below in detail.

Fields 1901F and 1901L contain interrupt vector addresses assigned by MP 240 to a corresponding interrupt source. This field specifies a vector address to firmware and specifies the priority of the interrupt with the interrupt source. The vector field in 1905B is updated when an entry in the interrupt control register array (described below) that corresponds to an active interrupt is seen as having a higher priority while the register array is being scanned.

Figure 24:
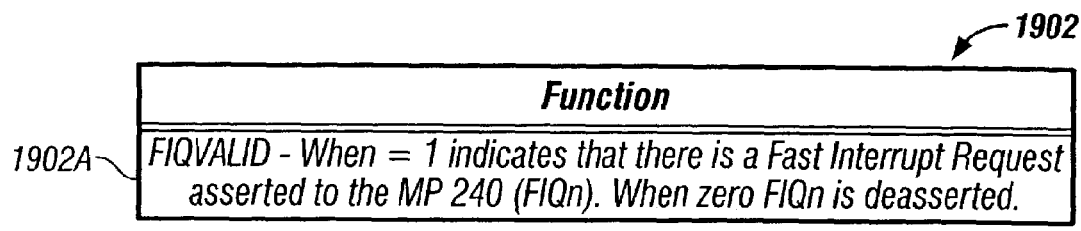

FIG. 24 shows the field used by register 1902. Field 1902A, when valid indicates that there is a fast interrupt request asserted to MP 240. Field 1902A is cleared when register 1902 is read.

Figure 25:
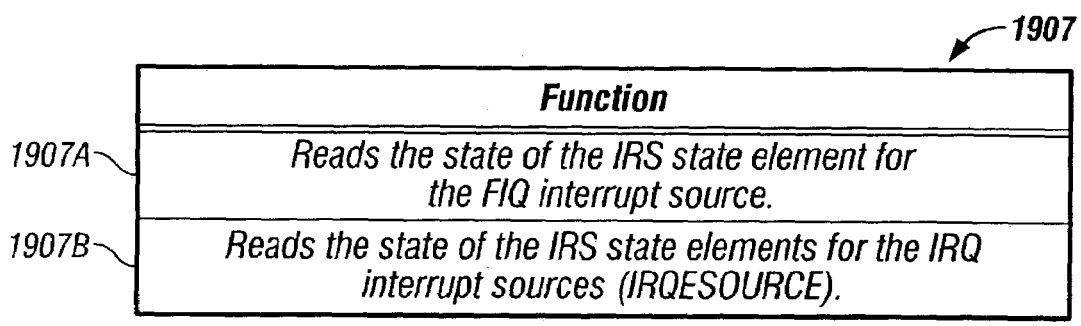

FIG. 25 shows the fields used in register 1907. Register 1907 is a control register showing when an interrupt has been sent. Field 1907A is used for a FIQ source and field 1907B is used for IRQ sources, as described below.

Figure 26:
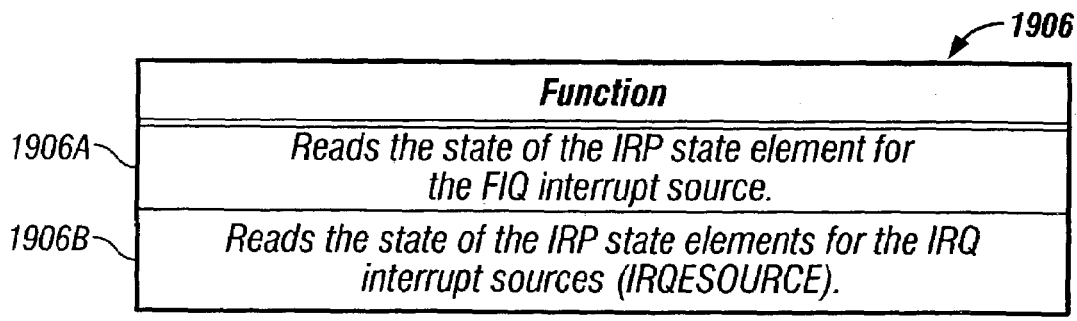

FIG. 26 shows the fields for register 1906 used for pending interrupts. Field 1906A is used for an FIQ source and field 1906B is used for IRQ sources, as described below.

Figure 27A:
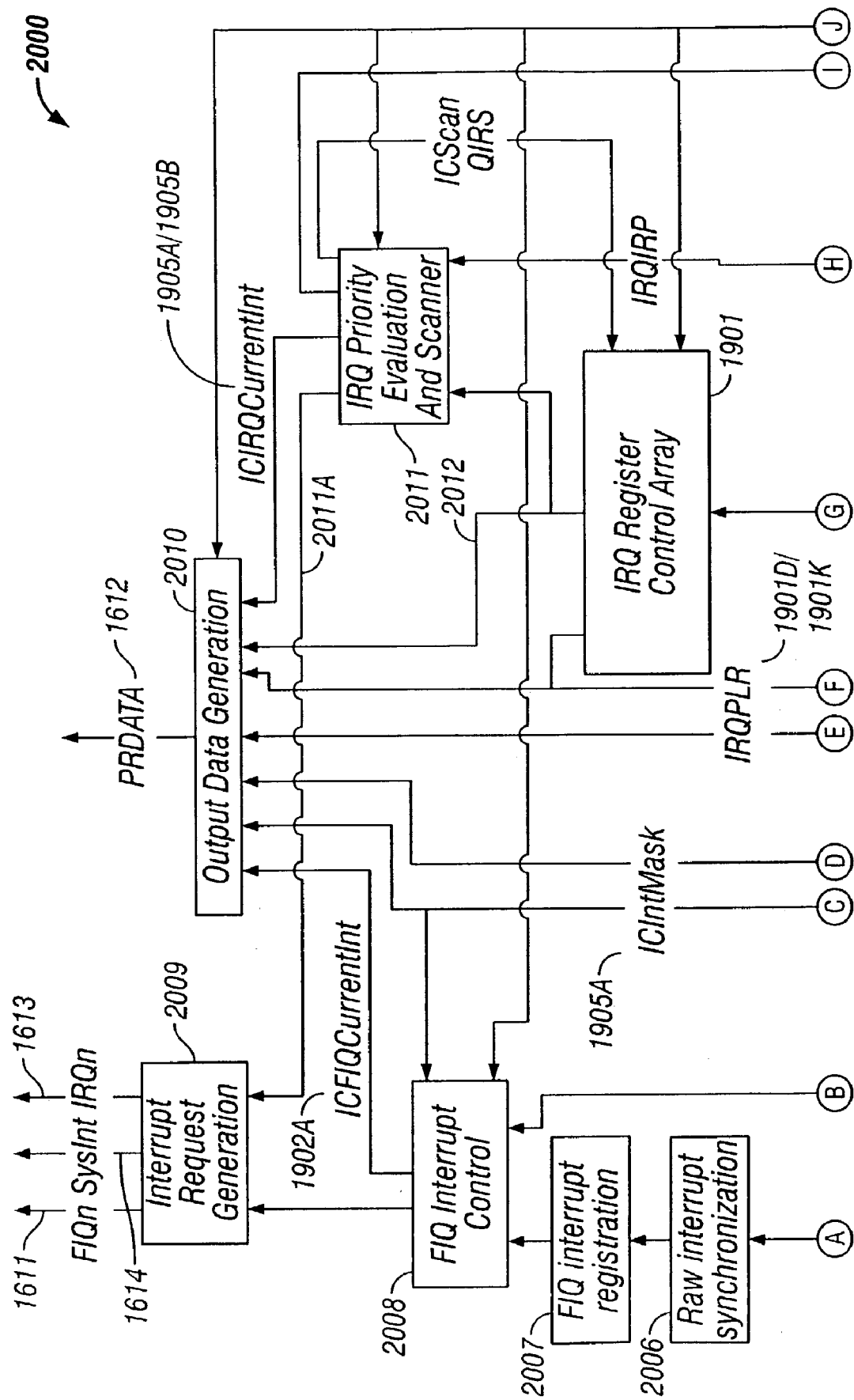
FIGS. 27A–27B (referred herein as FIG. 27) show a functional block diagram of the interrupt controller, according to one aspect of the present invention.
Figure 27B:
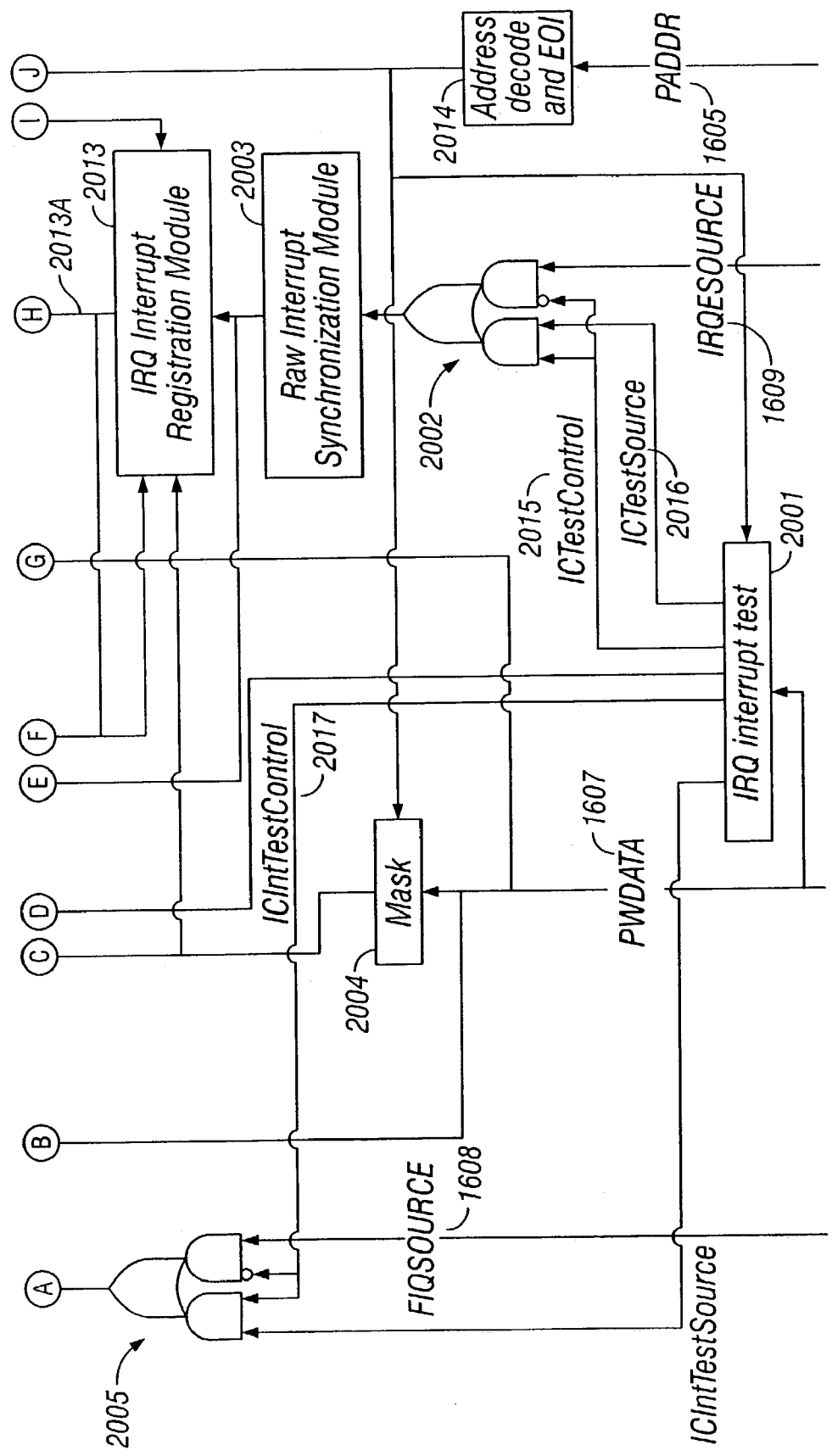

FIG. 27 shows a functional block diagram of system 2000 used by IC module 207, in various adaptive aspects of the present invention.

FIQ Interrupts:

Input signal 1608 from a FIQ source is sent to module 2005. Module 2005 selects either the FIQ source signal, or a TestSource signal depending on the state of ICIntTestControl 2017. If the FIQ source signal is selected, then it is synchronized by raw interrupt synchronization module 2006. The synchronized signal is sent for FIQ registration to FIQ registration module 2007. Module 2007 includes registers 1904, and 1902.

Signal 1607 is sent to mask module 2004 (that includes register 1903) and to FIQ IC module 2008. Mask module 2004 sends the mask (1903A) to FIQ IC module 2008, which then sends a signal to interrupt generation module 2009. Interrupt generation module 2009 also receives input from IRQ Scanner 2011 and based upon the priority of the request, an interrupt is generated, for example FIQn 1611, SysInt 1614 and IRQn 1613.

When FIQIRP 1904C is set, then a fast interrupt is asserted. The interrupt request signal remains asserted until MP 240 reads register 1902. When register 1902 is read, FIQn signal 1611 is de-asserted by setting FIQIRS 1904B and clearing FIQIRP 1904C.

In one aspect, another interrupt request cannot be made until FIQIRS 1904B is cleared as follows:

(a) If FIQ interrupt source as defined by TM 1904E is level sensitive then the firmware ensures that the FIQ interrupt source is de-asserted and then an end of interrupt ("EOI") is sent to IC 207 to clear the FIQIRS 1904B state; or (b) If the FIQ interrupt source as defined by TM 1904E is edge triggered, the firmware need only read register 1902, FIQIRP 1904C is cleared and FIQIRS 1904B is set. In edge triggered mode, FIQIRS clears when the interrupt source de-asserts. The next interrupt does not occur until the interrupt source signal de-asserts, and asserts again.

IRQ Interrupts:

Incoming IRQESOURCE signals 1609 is received by module 2002. Module 2002 selects either the IRQESOURCE signal, or TestSource signals depending on the state of ICTestControl 2015. If the IRQESOURCE signals are selected, then they are synchronized by raw interrupt synchronization module 2003. The synchronized signals are sent for IRQ registration to IRQ registration module 2013. IRQ interrupt registration module 2013 sets the field 1906B in register 1906. Signal 1607 is sent to mask module 2004 (that includes register 1903) and to IRQ Interrupt Registration Module 2013. Mask module 2004 sends the mask (1903A) to IRQ Interrupt Registration module 2013, which then sends signals to the IRQ Priority Evaluation And Scanner module 2011 (also referred herein as "IRQ Scanner 2011"). It is noteworthy that firmware may mask an interrupt before it is sent to MP 240. This de-registers the interrupt by clearing field 1906B.

For each possible interrupt input, information regarding that interrupt is stored in IRQ register control array 1901. Register control array 1901 includes vector values (1901F and 1901L), TM values (1901E and 1901K) and PLR values (1901D and 1901J) for each interrupt source, i.e. even and odd source. MP 240 may write the foregoing values in register control array 1901. Vector values 1901F and 1901L provide the offset for firmware to access the interrupt handler (Not shown) and establish the priority of the interrupt within plural interrupt sources, for example, 16 IRQ sources. It is noteworthy that the invention is not limited to 16 IRQ sources. In one aspect, the highest vector value is given the highest priority. When one of the registers in register control array 1901 is read then, the mask, IRS, IRP, Vector, TM and PLR values are also read at the same time. Output 2012 from register control array 1901 is sent to IRQ scanner 2011 that scans the vector values, as described below. IRQ scanner 2011 provides an input 2011A to interrupt generator 2009 that generates IRQn 1613.

When MP 240 retrieves the IRQ interrupt from IC module 207 it reads register 1905 which sets the IRQIRS bit (1901B or 1901I) associated with the interrupt source in register 1905, which prevents the same interrupt source from generating another interrupt until the IRQIRS bit is cleared.

In one aspect, another interrupt from the same source cannot be made until IRQIRS (1901B or 1901I) is cleared as follows:

(a) If the IRQ interrupt source is defined by TM 1901E or 1901K as level sensitive then the firmware ensures that the IRQ interrupt source is de-asserted. Thereafter, an end of interrupt ("EOI") is sent to IC 207 to clear the IRQIRS 1901B or 1901I state; or (b) If the IRQ interrupt source is defined by TM 1901E or 1901K as edge triggered, the firmware need only read register 1905. IRQIRP 1901C or 1901H is cleared and IRQIRS 1901B or 1901I is set. In edge triggered mode, IRQIRS clears when the interrupt source de-asserts. The next interrupt does not occur until the interrupt source signal de-asserts, and asserts again.

Figure 28:
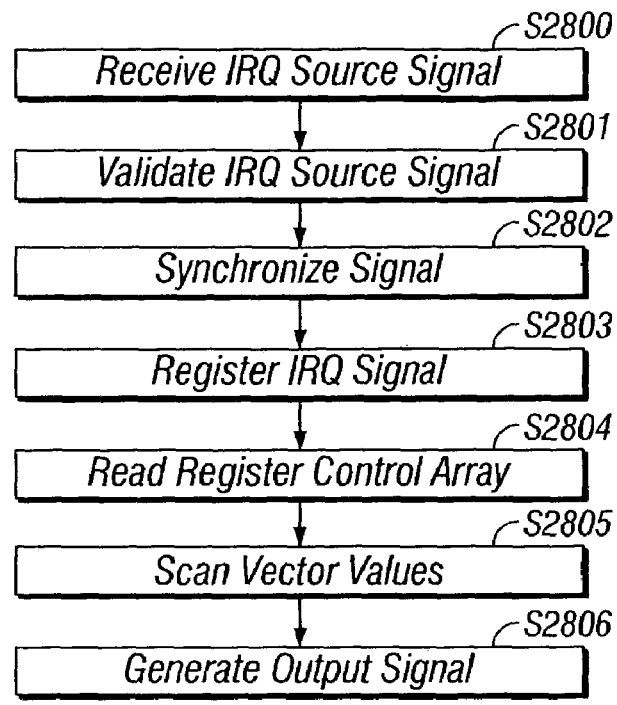
FIG. 28 is a process flow diagram for generating interrupts, according to one aspect of the present invention.

FIG. 28 is a flow diagram for IRQ generation with respect to the functional diagram of FIG. 27 and the various registers described above.

In step S2800, an IRQ signal 1609 is received from an interrupt source.

In step S2801, IRQ signal 1609 is selected by logic 2002.

In step S2802, valid IRQ signal 1609A is synchronized by synchronization module 2003.

In step S2803, synchronized IRQ signal 1609B is registered by IRQ interrupt registration module 2013.

In step S2804, registers in register control array 1901 are read.

In step S2805, vector values are scanned (discussed below with respect to FIG. 29).

In step S2806, based on the vector values, output interrupt signal 1613 is sent to MP 240.

Figure 29:
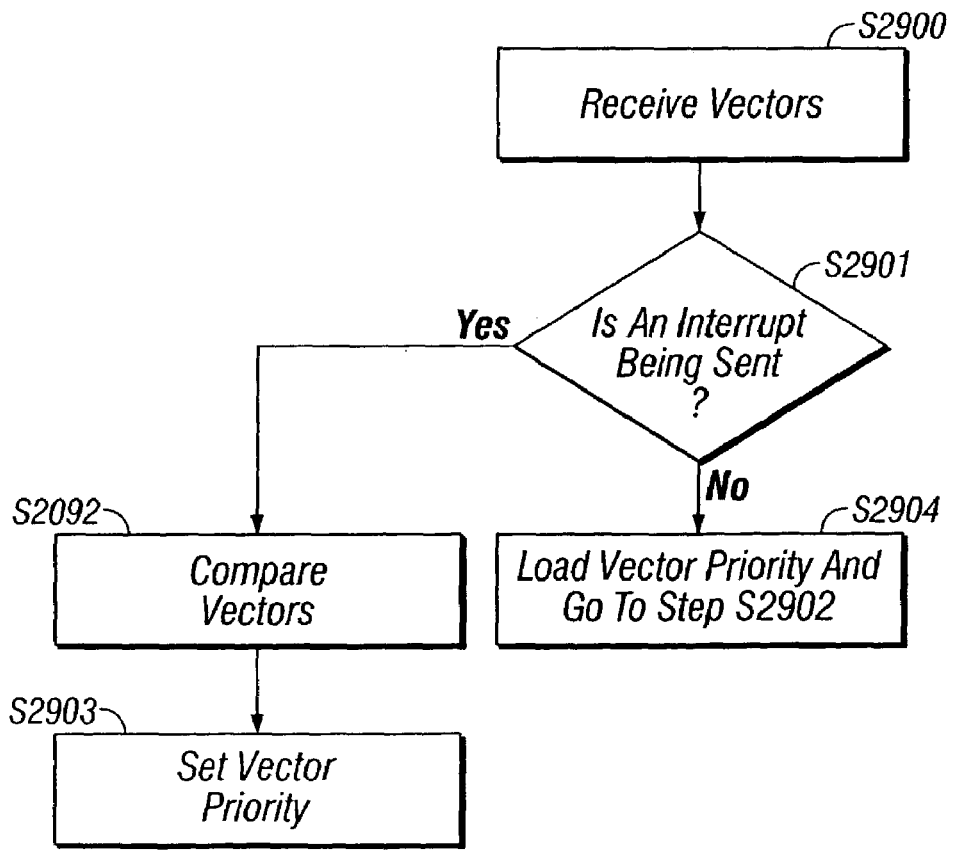
FIG. 29 is a process flow diagram for setting interrupt priority, according to one aspect of the present invention.

FIG. 29 is a flow diagram showing executable process steps used by IRQ scanner 2011.

In step S2900, IRQ scanner 2011 receives register values 2012 from register control array 1901 and IRQESOURCE 2013A from IRQ interrupt registration module 2013. IRQ scanner 2011 receives vector values from register control array 1901. IRQ scanner 2011 examines each interrupt during every interrupt cycle In step S2901, the process determines if an interrupt is being sent (sent as used here includes "pending" interrupts). If an interrupt is being sent (or pending), then in step S2902, IRQ scanner 2011 compares the vector values of the interrupt being sent (or pending) with the scanned vector values of every other active interrupt input in a given interrupt cycle.

In step S2903, IRQ scanner 2011 replaces the previous vector values if the most current vector values have higher priority.

If an interrupt is not being sent (or pending) in step S2901, then in step S2904, IRQ scanner 2011 loads the current vector values from an active interrupt input from S2901 and the process moves to step S2902.

Figure 30:
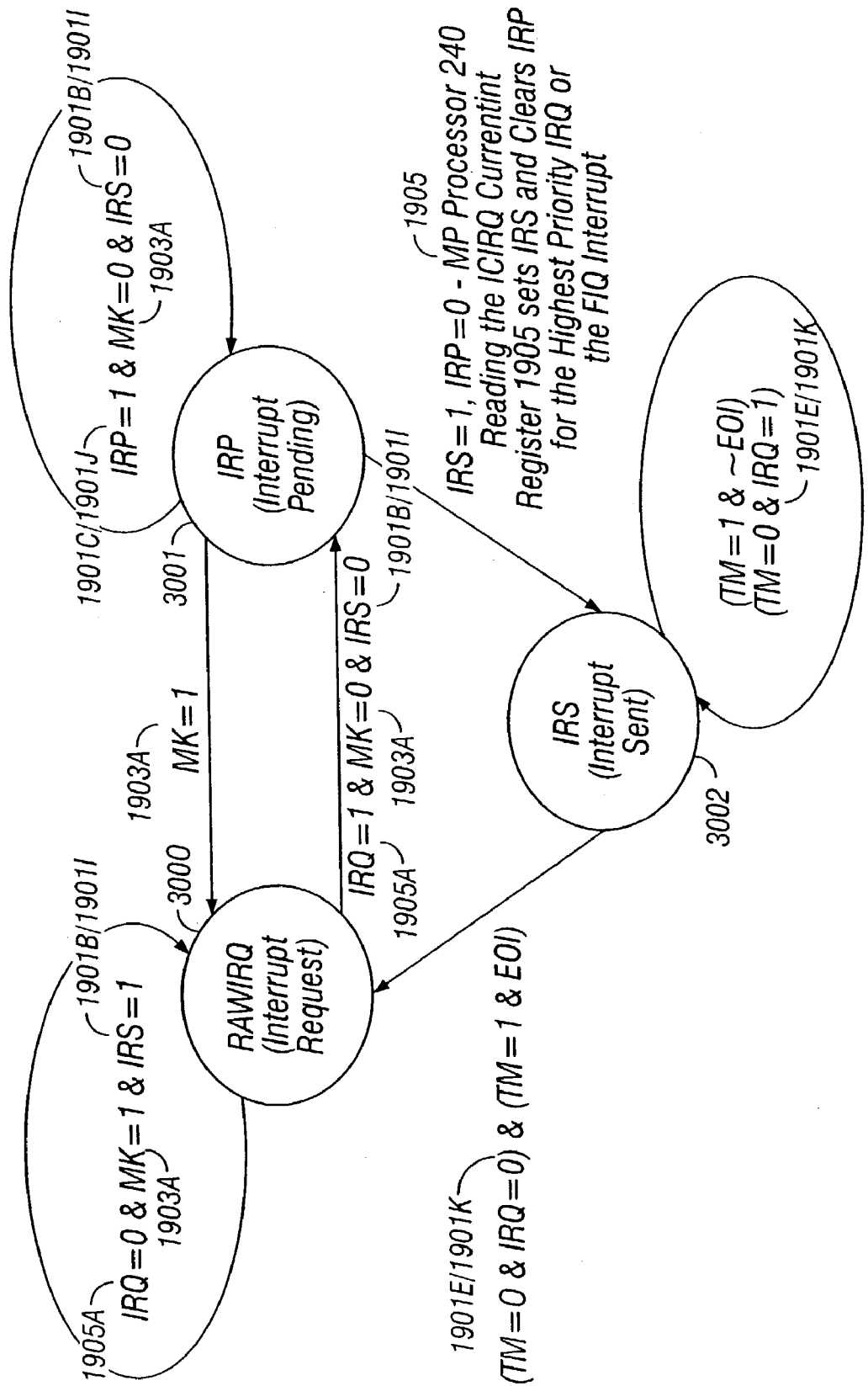
FIG. 30 is a state machine diagram used by the interrupt controller, according to one aspect of the present invention.

FIG. 30 shows a state diagram for interrupt control, according to one aspect of the present invention. It is noteworthy, that although the state diagram of FIG. 30 shows that it is for IRQ interrupts, the same will also apply for FIQ interrupts. State diagram includes three states 3000, 3001 and 3002. State 3000 is for receiving an interrupt request. State 3001 is an interrupt pending state and state 3002 is an interrupt sent state. Based on the foregoing discussions regarding FIGS. 16–29, the state transitions of state diagram in FIG. 30 are self-explanatory.

In one aspect of the present invention, a fast interrupt scheme is provided so that for critical interrupts, MP 240 does not have to wait.

In another aspect of the present invention, interrupt priority is established efficiently by a scanning process.

In yet another aspect of the present invention, firmware can change priority and mask interrupts from any source, providing flexibility to a user and also optimizes MP 240 usage.

In another aspect of the present invention, use of TM values prevents interlocking of interrupt service by MP 240.

History Module 234:

History module 234 is a peripheral on APB Bus 208 that records transaction information over either AHB Bus 236 and/or APB Bus 208. The recorded information may be used for debugging and analyzing firmware and hardware problems. History module 234 is set up and initiated through APB Bridge 235 and information from History module 234 is extracted through APB Bridge 235. History module 234 includes a buffer(s) (not shown) for reading and writing recorded information.

Figure 31:
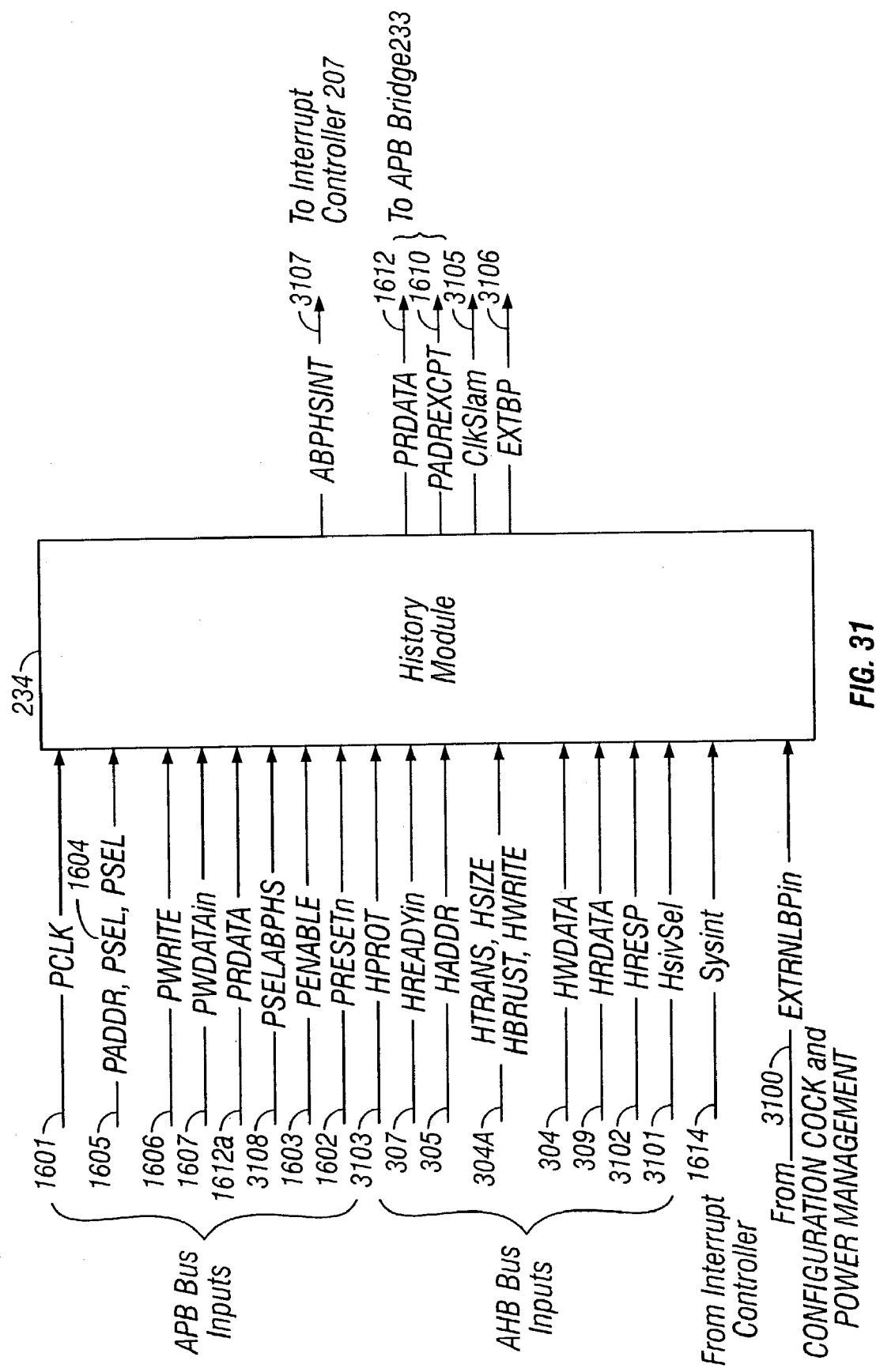
FIG. 31 is a block diagram of history module, according to one aspect of the present invention.

FIG. 31 shows a top-level block diagram of History Module 234 with plural input and output signals.

FIGS. 32A-1, 32A-2, 32A-3, 32A-4 and 32B provide a description of the input and output signals, respectively.

FIG. 33 provides a listing of a register map 3309 used by History Module 234. Register map 3309 includes various registers that are used for setting up History Module 234 recording and control conditions. The base address of History Module 234 is specified in APB bridge 235 and when PSELABPHS 3108 is asserted to History Module 234, the base address has been detected by APB bridge 235. History Module 234 decodes PADDR 1605 and PWRITE 1606 to select accessed memory mapped registers.

FIG. 34 provides a table for register 3300 with the various fields (3300A–3300J) to control and set up History Module 234. SelectMask 3300A field if set isolates certain components in system for monitoring and recording by History Module 234. Firmware can also filter read and/or write operations. By setting fields 3300B and 3300C, read and/or write operations are not recorded by History Module 234.

Field 3300J defines break point conditions for History Module 234. Break point conditions are those, which stop recording/monitoring by History Module 234. Field 3300I enables break points, while break point testing stops after a break point is detected, if field 3300E is set.

Trigger mode field 3300G specifies the number of entries made in a History Module 234 buffer after a break point condition is detected.

FIG. 35 shows register 3500 that stores a history stack pointer (referred to as "HstryStkPtr" or "HSP") 3501. HSP 3501 provides the address of the next entry at a given time, for either reading from, or writing to, the history module 234 buffer.

HSP 3501 may be zero at the beginning of a recording session. Firmware has the flexibility to change HSP 3501 values. In one aspect, firmware may set this value to zero. HSP 3501 allows the firmware to recover a recording regardless of the reason why a recording session stopped. HSP 3501 is incremented each time an entry is accessed from the history stack buffer.

Figure 36A:
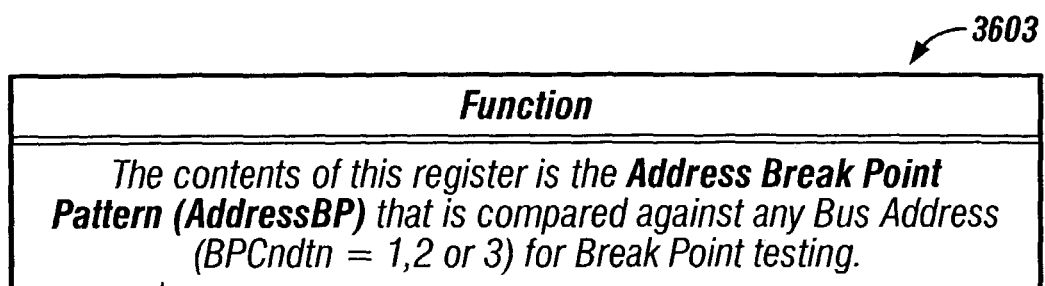

FIG. 36A shows register 3603 that provides the address break point pattern for address break point testing. Field 3602 provides the address break point pattern for such break point testing.

Figure 36B:
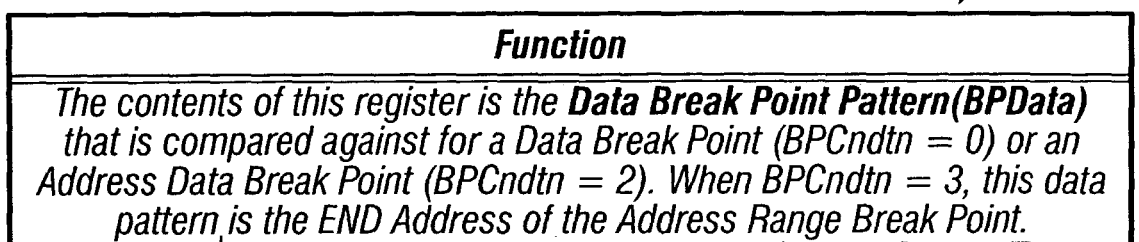

FIG. 36B shows a data/address break point pattern register 3600 (DataAdrBPPReg 3600) that stores break point data pattern ("BPData") field 3601. BPDATA field 3601 is compared against a data and address break point condition. Based on the selected break point condition and the comparison a break point sets and recording by History Module 234 stops when the trigger mode is satisfied.

Figure 37:
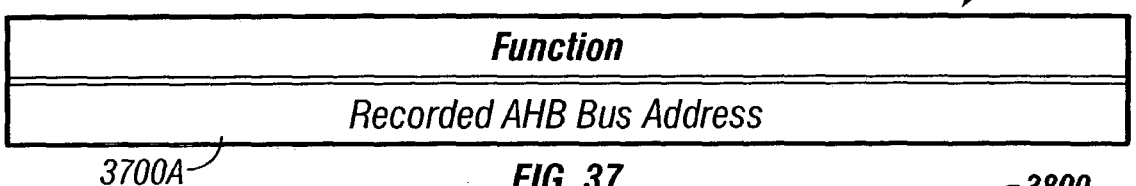

FIG. 37 shows register 3700 that includes recorded bus 236 information in history module 234 buffer. When register 3700 is read, history stack pointer 3501 is incremented.

Figure 38:
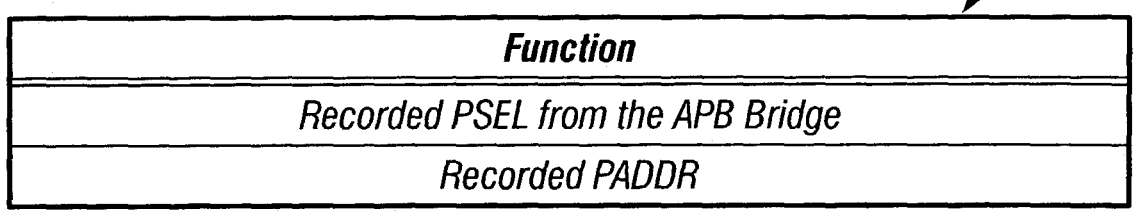

FIG. 38 shows register 3800 that includes recorded APB bus 208 address information (similar to register 3700). Register 3500 is incremented after register 3800 is read.

Figure 39:
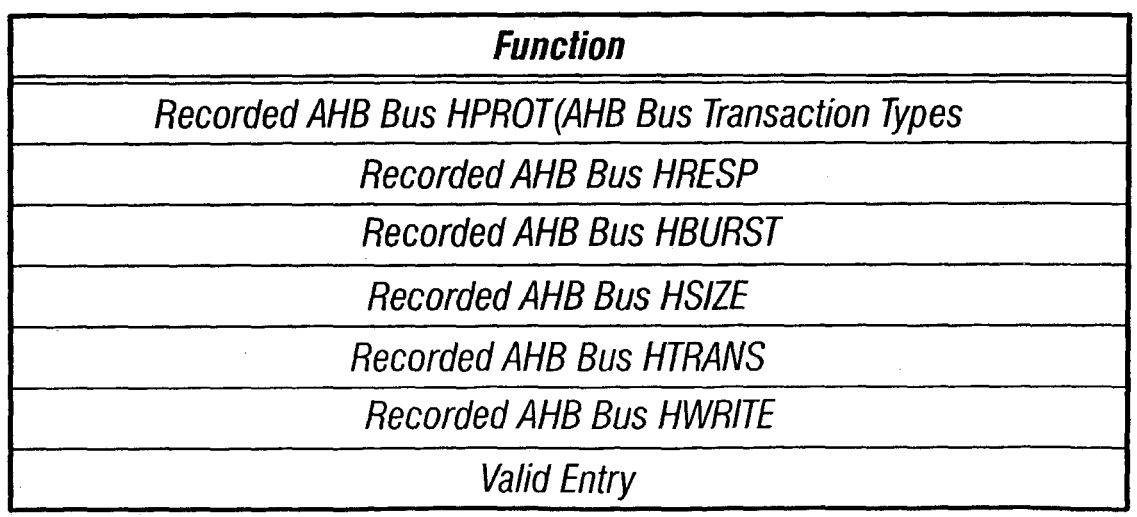

FIG. 39 shows a control history register 3900 that includes recorded AHB bus 236 information. Register 3500 is incremented after register 3900 is read.

FIG. 40 shows a control history register 4000 that includes recorded APB bus 208 information. Register 3500 is incremented after register 4000 is read.

FIG. 41 shows register 4100, which includes AHB bus 236 or APB bus 208 data specified by the pointer value in register 3500. Register 3500 is incremented after register 4100 is read.

FIG. 42 shows register 4200 that includes a Clear History Stack Buffer ("CHSB") field 4201. Setting CHSB field 4201 clears HSP 3501. CHSB 4201 is set while zero data is being written to buffers 4313 to 4315.

FIG. 43 shows register 4300 that includes a "Set EnableRecord" field 4300A that may be set by firmware. When field 4300A is set, History module 234 starts recording and the recording stops when field 4300A is cleared.

Figure 44A:
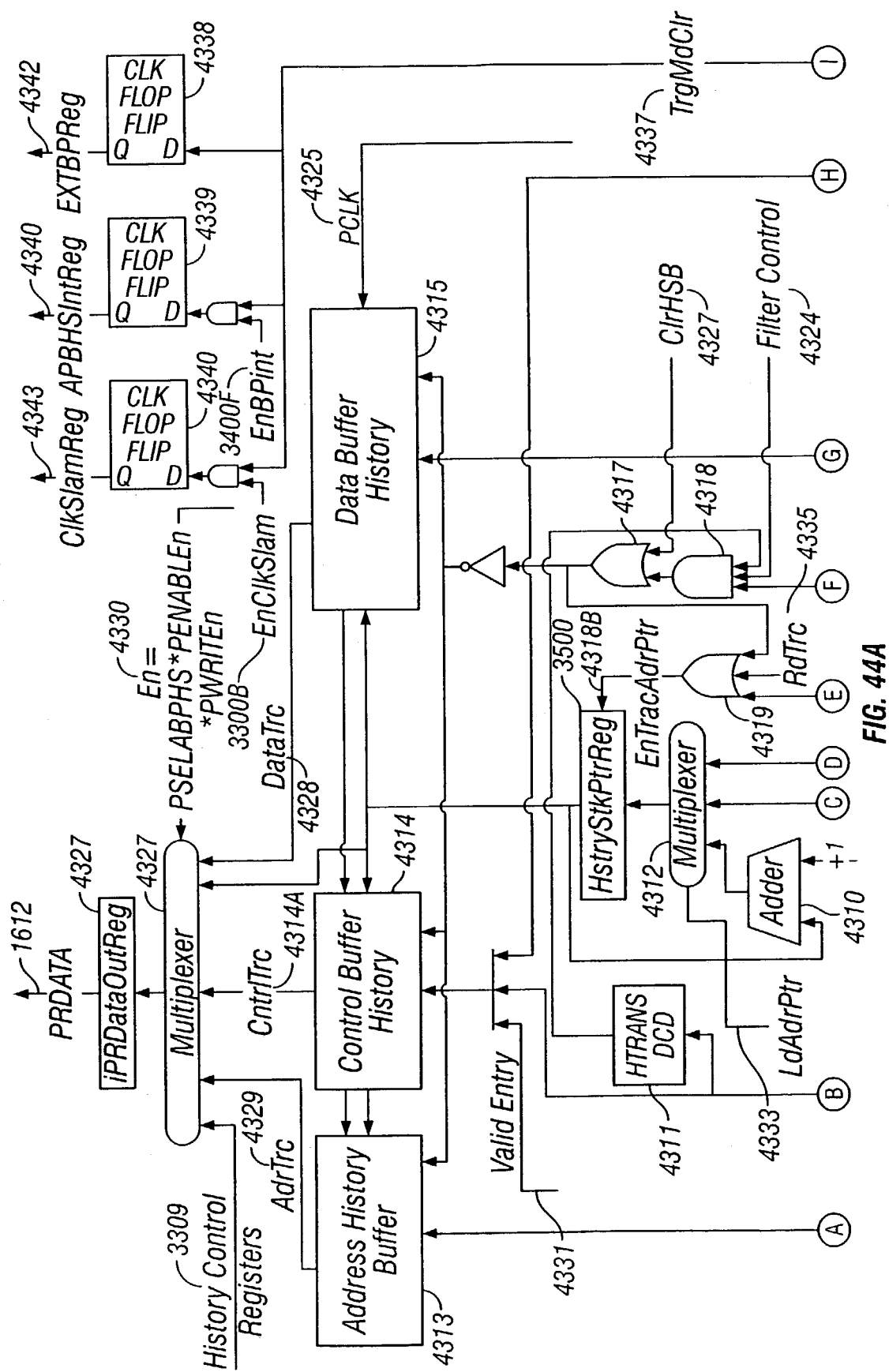
FIGS. 44A–44B (referred to herein as FIG. 44) show a functional block diagram of the history module, according to one aspect of the present invention.
Figure 44B:
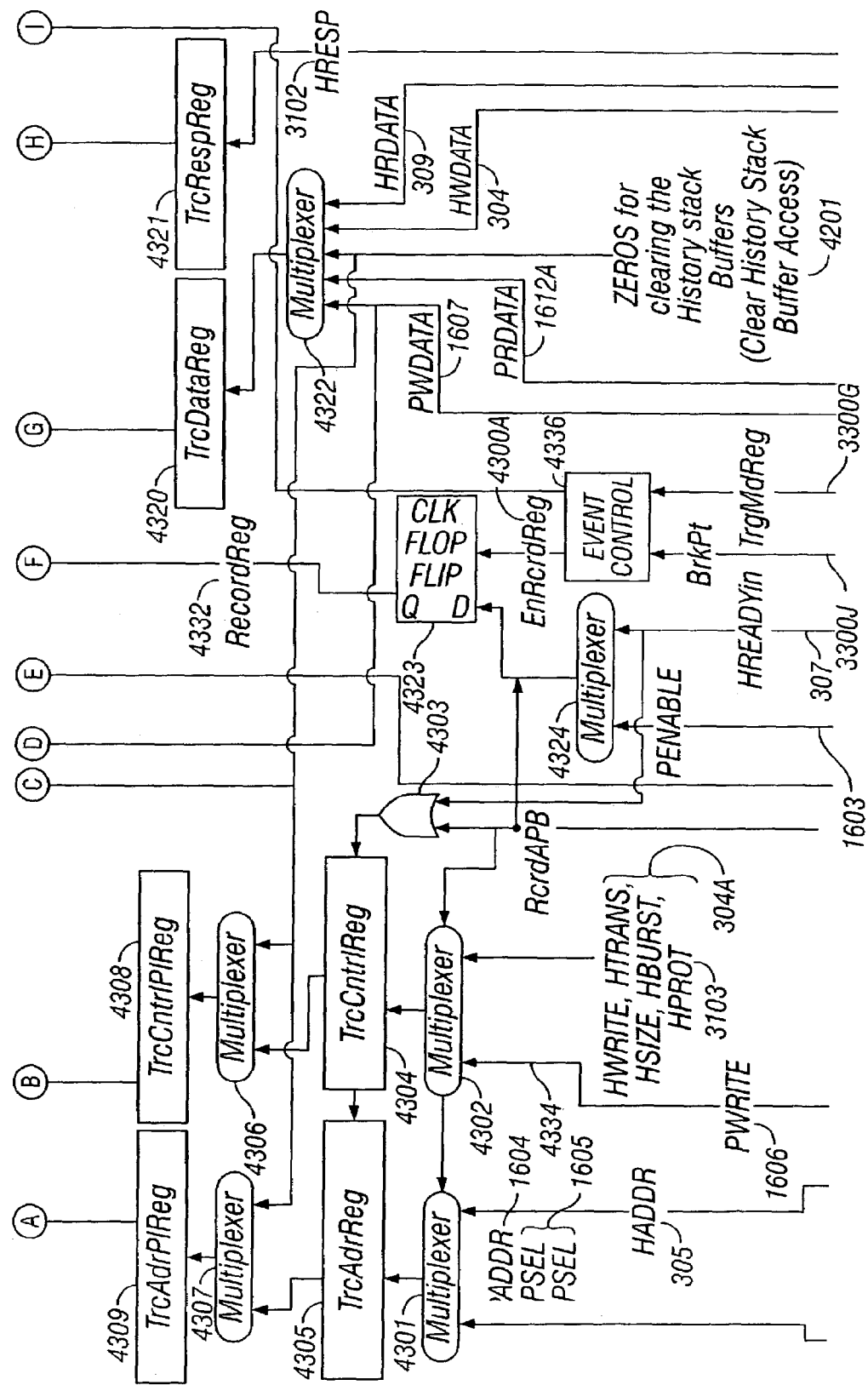

FIG. 44 is a functional block diagram, of history module 234 that will be described below with respective to various inventive aspects of the present inventions. History module 234 may be setup by firmware to perform its various function. Control information is written to register 3300. If a break point is desired for address and/or data, or address range, then MP 240 sets registers 3600 and 3603.

To start history module 234, field 4300A of register 4300 is set, that allows recording when signals HREADY 307 or PENABLE 1607 are asserted. In one aspect of the present invention, history module 234 may record data simultaneously for buses 236 and 208. This allows history module 234 to write in buffers 4313, 4314 and 4315. Although FIG. 44 shows three buffers for address, control and data information, the invention is not limited to the number of buffers used by history module 234. For example, only one or more buffers may be used to implement the adaptive aspects of the present invention.

History module 234 continues to make entries until a break point (or event) is reached as defined by fields 3300I and 3330J in register 3300 or field 4300A is cleared by firmware, as discussed below in detail.

Valid Recorded Entry: Before recording, buffers 4313, 4314 and 4315 are cleared by firmware issuing a "clear History stack Buffer Access 4201 command. All valid entries in buffer 4314 are cleared. When recording, field 4201 is toggled each time an entry is made in buffers 4313–4315.

Break Point and Break Point Interrupt: Firmware can set field 3300I to enable a break point defined by break point condition field 3300J. Event control module 4336 generates field 4300A value that is sent to flip-flop module 4323. Firmware can set field 4300A value that enables flip-flop module 4323. History module 234 tests for break point condition 3300J in every clock cycle as defined by firmware.

When history module 234 detects the defined break point condition then it stops recording bus transactions based on TM value 3300G and an interrupt may be generated, as discussed below. After a break point is detected, history module 234 stops recording and based on field 3300E setting either continues to test for the break condition or stops testing for the break point condition.

An interrupt is generated based on the detection of the break point condition and if field 3300F is set, after the interrupt source is enabled in IC module 207.

Break points may be set for address and/or data or address range based on fields 3601 and 3602. Firmware may also send a "Clear Enable Record status" field 4300A to trigger a firmware break point, if a firmware break point condition is set in 3300J.

Clock Slam: When a break point condition is detected, and if field 3300D is enabled (Enable clock Slam), history module 234 asserts signal ClkSlam 4343 to clock control via flip-flop module 4340. Break point condition 3300J', which indicates that a break point condition has occurred, is sent to event control module 4336 with trigger mode value 3300G. This stops all the clocks in system 200. This signal remains asserted until system 200 is reset. This allows system 200 component information to be scanned out for analysis and diagnosis using standard debugging tools.

Filter Control: History module 234 can selectively filter out system 200 components based on filter control command 4324. Filter control command 4324 is based on select mask field 3300A in register 3300. If field 3300A is set then transactions related to, a specific peripheral(s) or slave (depending on the bus) is not recorded.

Trigger Mode:

Trigger mode field 3300G specifies the number of entries that are made in buffers 4313–4315 after a break point condition has been detected. In one aspect, field 3300G may be set so that history module 207 stops recording within a single clock cycle, or may continue to record a pre-defined amount of data before stopping.

Starting and Stopping Recording: 6History module 234 starts and stops recording based on register 4300 fields. Field 4300A when set to "EnableRcrdReg", allows history module 234 to record. Setting "Clear Enable Record and Status" bit in field 4300A stops history module 234 from recording and break point testing, unless specified otherwise by firmware.

Bus (208 and 236) transactions are recorded when EnableRcrdReg is set. Mux 4324 samples signals HREADY 307 and PENABLE 1603. The signals indicate that a valid transaction is on the bus that may be recorded unless masked by field 3300A.

History Stack Pointer:

History stack pointer 3500, as shown in FIG. 35, keeps track of where the next entry in buffer 4313–4315 will be made while history module 234 is recording. When an entry is made in buffers 4313–4315, pointer 3501 is updated. When history module 234 stops making entries in buffers 4313–4315, the value of 3501 points to the last entry plus one.

Extracting Recorded History Information:

As stated above, when recording stops, history stack pointer 3501 points to the "oldest recorded entry". MP 240 bus master (not shown) reads the history address buffer 4313 and history module 234 places the recorded entry into register 4300 (FIG. 43) and history stack pointer now pointing to the last entry read is incremented by one. APB bridge 235 returns the recorded entry to MP 240 bus master and it increments it's read count. After buffer 4313 is read, the same process is applied to buffers 4314 and 4315.

Figure 45:
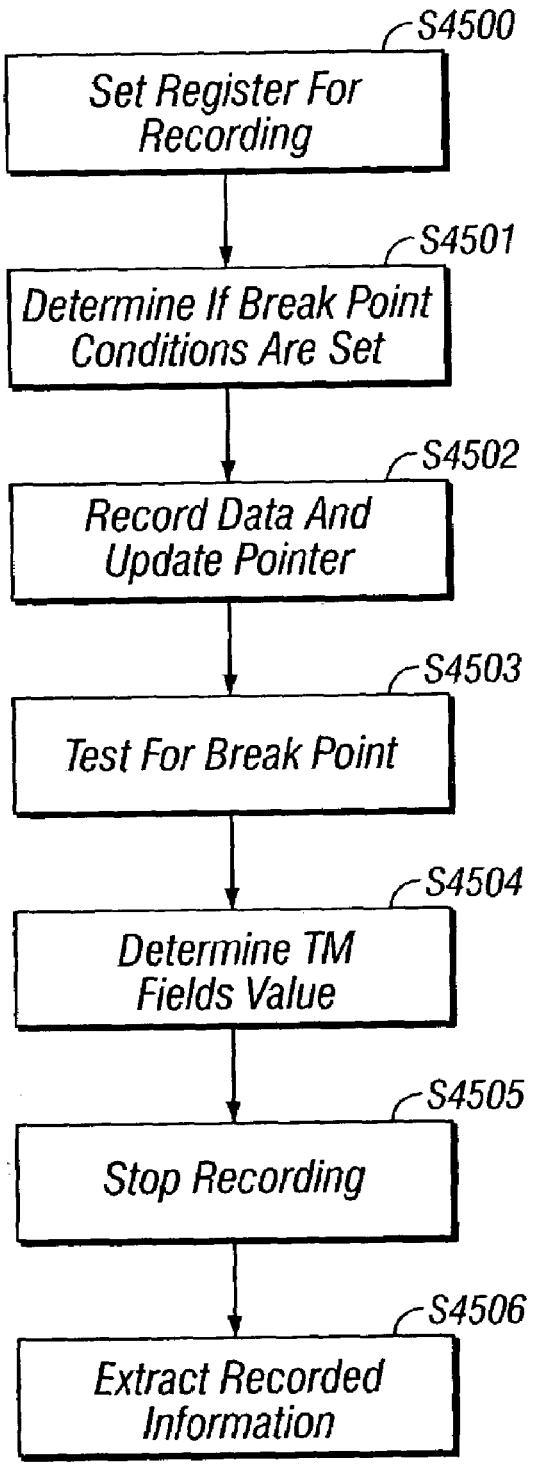
FIG. 45 is a flow diagram of process steps for updating a history stack pointer, according to one aspect of the present invention.

FIG. 45 shows a flow diagram of executable process steps in history module 207 for recording bus transactions in system 200, according to one aspect of the present invention.

Turning in detail to FIG. 45, is step S4500, the process sets up registers for recording. Field 4300A is set to "EnableRcrdReg" (also referred to as "EnRcrdReg" in FIG. 43)*to* record transactions.

In step S4501, the process determines if field 3300E is set to enable any break point testing. Field 3300J in register 3300 may be used to specify break point conditions.

In step S4502, transactions are recorded. Bus (208 and 236) transactions are recorded when EnableRcrdReg field 4300 is set. Signals HREADY 307 and PENABLE 1603 are sampled by Mux 4324. The signals indicate that a valid transaction is on the bus that may be recorded unless masked by field 3300A. When an entry is made in buffers 4313–4315, pointer 3501 is updated. When history module 234 stops making entries in buffers 4313–4315, the value of 3501 points to the last entry plus one.

In step S4503, based on whether break point condition testing is enabled, history module 234 tests for break point conditions. Based on the setting of EnBPStp 3300E, history module 234 may continue or stop break point condition testing after a particular break point is encountered.

In step S4504, the process determines the value of TM field 3300G. This sets the amount of data that is to be recorded after a break point condition is detected. It is noteworthy that steps S4502–4504 may occur simultaneously.

In step S4505, recording is stopped and field 4300A is cleared.

In step S4506, recorded information is extracted. MP 240 bus master (not shown) reads the history address buffer 4313 and history module 234 places the recorded entry into register 4327 (FIG. 44A) and history stack pointer 3501 is incremented by one. APB bridge 235 returns the recorded entry to MP 240 bus master and it increments its' read count. After buffer 4313 is read, the same process is applied to buffers 4314 and 4315.

In one aspect of the present invention, history module 234 provides visibility to transactions on the internal AHB Bus 236 or APB Bus 208.

In one aspect of the present invention, history module 234 selects specific slave or peripheral transactions for recording based on a slave or peripheral mask. This allows selective monitoring of system 200 components.

In yet another aspect of the present invention, the process described above provides break point conditions for stopping History module 234 recording. However, external break point signal may be continually provided after recording stops. In addition, break point conditions may be provided for an Address/Data break point and an Address Range break point.

In another aspect of the present invention, an external analyzer is not required to record bus transactions. This saves pins and the effort required connecting system 200 to an external device so that its components can be monitored.

Figure 46:
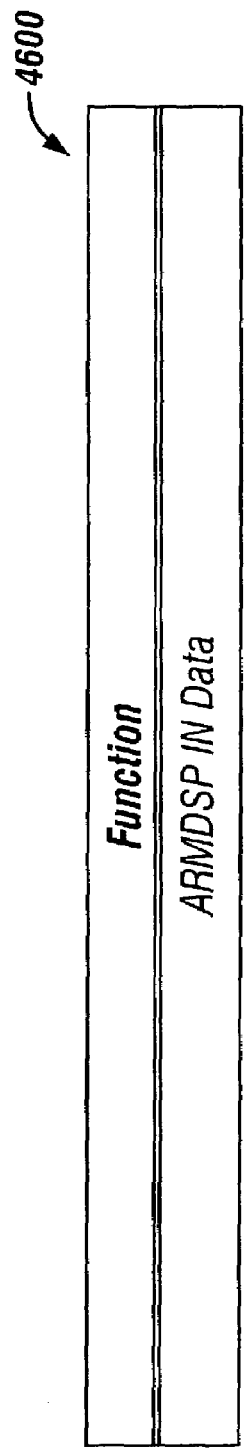
Figure 47:
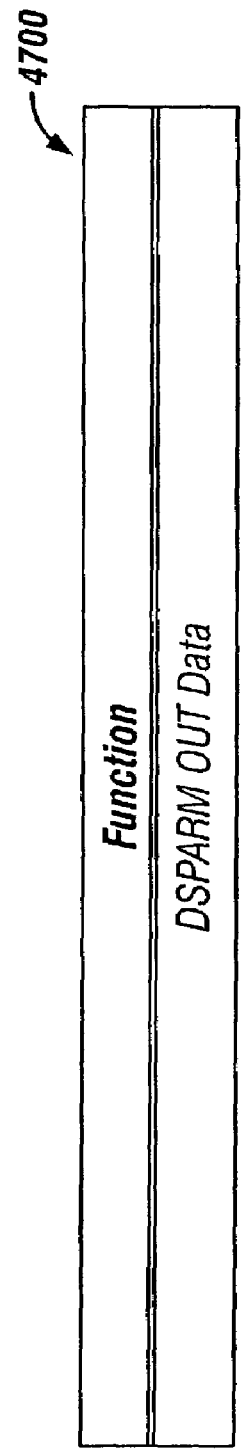

Firmware Synchronization:

DSPIM 210 provides an interface for communication between MP 240 and DSP 229 as a bridge between APB bus 208 and DSPAHB bus 233. DSPIM 210 provides an IN/OUT register file for passing command and status parameters between MP 240 and DSP 229. FIG. 46 and 47 show registers that are used for MP 240 and DSP 210 to communicate with each other. Register 4600 and 4700 are addressable from APB bus 208 and DSPAHB bus 233. Registers 4600 and 4700 provide a "mail box" for exchange of information between MP 240 and DSP 229. Register 4600 can be read and written by MP 240. MP 240 can only read register 4700, while DSP 229 may read or write. An attempt by MP 240 to write into register 4700 results in declaration of "address exception" by DSPIM 210. Contents of registers 4600 and 4700 are based on firmware and user defined parameters.

MP 240 writes in register 4600 and interrupt is sent to DSP 229. MP 240 sets field 4900C in status register 4900, which generates an interrupt to DSP 229.

Figure 50:
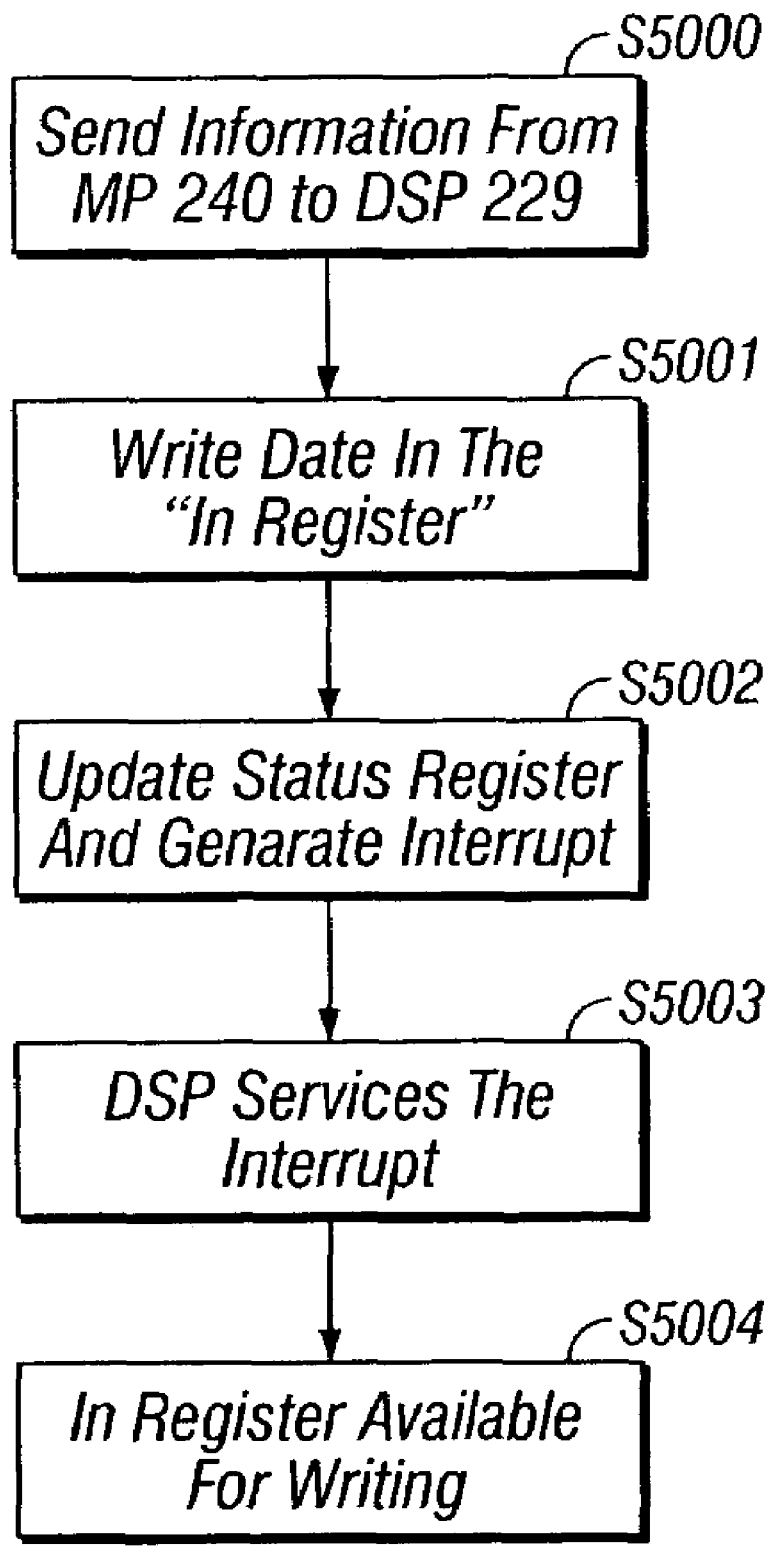
FIG. 50 shows a flow diagram of process steps for inter-processor communication, according to one aspect of the present invention.

FIG. 50 shows a flow diagram of communication between MP240 and DSP 229 using IN/Out registers 4600 and 4700, respectively.

In step S5000, MP 240 send information to DSP 229.

In step S5001, MP240 writes the information (or address of the information) in register 4600.

In step S5002, MP 240 sets field 4900C and generates an interrupt for DSP 229.

In step S5003, DSP 229 services the interrupt by reading register 4600 and clears field 4900C.

In step S5005, register 4600 is again available for MP 240 to write into register 4600.

DSPIM 210 is operationally coupled to memory module 212 via interface 230. MP240 and DSP 229 for storing firmware control instructions and any other information may use memory module 212. Interface 230 allows APB bus 208 to access memory module 212 while DSPIM 210 executes firmware instructions.

Memory module 212 is shared using registers 4600, 4700 and semaphore register 5100 shown in FIG. 51. Semaphore register 5100 field 5100A provides firmware interlock when MP 240 acquires the semaphore. Semaphore register 5100 field 5100B provides hardware interlock when MP 240 acquires the semaphore. DSP 229 cannot execute a write access to any register except register 5100 or a status register.

Figure 53:
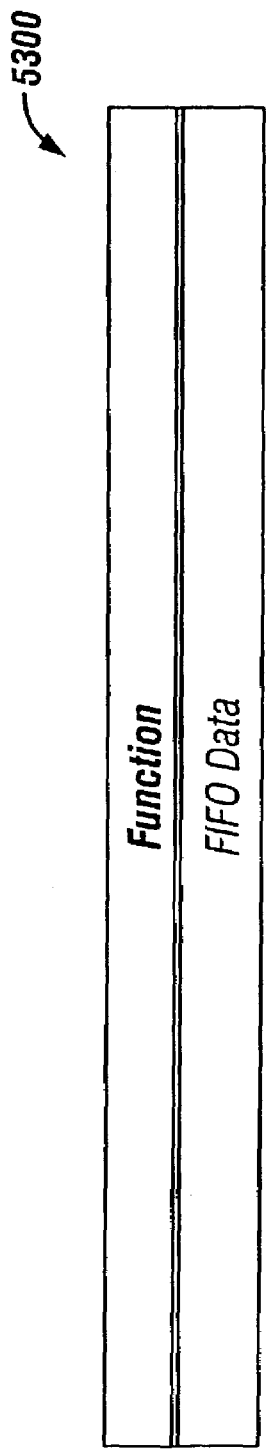

Memory module 212 uses an indirect access register 5200 that facilitates communication between DSP 229 and MP 240 without using any counters. Memory module 212 uses at least a FIFO buffer from where data may be read and/or written. Memory module 212 uses register 5300 (FIG. 53) that includes FIFO data. MP 240 sets up field 5200A that allows indirect access. Field 5200G indicates the starting address of memory module 212. Each access to register 5300 updates field 5200G.

An indirect read transaction may be initiated by setting up field 5200A and 5200C. Each time register 5300 is accessed, the address in field 5200F is updated. If field 5200C is set then it indicates that the read access is a sequence of continual read accesses that keeps memory module 212 FIFO (not shown) full.

An indirect write access may be initiated by setting field 5200A and 5200B. After the indirect access, register 5300 is updated with data that is written into memory module 212. Each time data is written into register 5300, DSPIM 210 writes data into memory module 212.

One advantage of providing the mail-box" concept is that no write conflict occurs between MP 240 and DSP 229.

In one aspect, MP 240 and/or DSP 229 do not have to gain ownership and then relinquish ownership (clear) of any registers to communicate with each other. This saves performance time and improves overall efficiency, because the registers are dedicated.

In another aspect of the present invention, indirect access is available to access memory module 212.

In another aspect of the present invention, the IN/Out mailbox environment may be used to efficiently run test cases. MP 240 using Assembler or any other language may run test cases. A sub-set of test instructions may be executed by DSP 229. The mailboxes have a buffer (not shown) that keeps a real-time picture of a test case. When the test is complete, mail-boxes are unloaded and a report may be generated that can be used for bug fixing and analysis.

Although the present invention has been described with reference to specific embodiments, these embodiments are illustrative only and not limiting. Many other applications and embodiments of the present invention will be apparent in light of this disclosure and the following claims.

What is claimed is:

1. An embedded disk controller, comprising:
   a main processor in communication with a first bus;
   a second processor in communication with a second bus; and
   an external bus controller ("EBC") located on the embedded disk controller for managing a plurality of memory devices external to the embedded disk controller via an external bus interface and coupled to the first bus and an external bus, wherein each of the plurality of memory devices has at least one of different timing characteristics and different data widths and the EBC stores at least one of a segment descriptor and a device range.

2. The system of claim 1, wherein the segment descriptor includes at least one of address space sizes and timing characteristics of the plurality of memory devices.

3. The system of claim 1, wherein the device range register enables the first main processor to access an address space in the devices.

4. The system of claim 1, wherein high performance bus transactions may be translated into external bus transactions regardless of the external bus width.

5. The system of claim 1, wherein system firmware can control sequence of bus transactions.

6. A method for controlling memory devices external to an embedded disk controller with a first main processor operationally coupled to a high performance bus and a second processor operationally coupled to a peripheral bus, comprising:
   receiving an input signal at an external bus controller (EBC) that is located on the embedded disk controller and connected to the high performance bus and an external bus;
   determining at the EBC at least one of timing characteristics and a device range of one of a plurality of external memory devices that are connected to the external bus, that are not located on the embedded disk controller, and that are a target for a read or write cycle, wherein each of the plurality of external memory devices has at least one of different timing characteristics and different data widths; and
   asserting a write enable or read enable signal on the external bus based on the input signal and at least one of the determined timing characteristics and device range.

7. The method of claim 6, wherein a state machine executes the process steps of claim 6.

8. A system for managing devices external to an embedded disk controller:
   a main processor in communication with a first bus;
   a second processor in communication with a second bus;
   an external bus interface controller located on the embedded disk controller that is connected to the first bus, the second bus, and an external bus and that includes at least a segment descriptor register and at least a device range register, and that manages a plurality of memory devices external to the embedded disk controller via an external bus interface based on contents of at least one of the segment descriptor register and the device range register, wherein each of the plurality of external memory devices has at least one of different timing characteristics and different data widths; and
   a state machine logic with a first idle state until a valid input signal is received; a first decoding stage for decoding an address to determine which external device is a target for a read or write cycle; a second stage that avoids data contention on an external bus; and a chip select signal stage during which an output signal is generated.

9. The system of claim 8, further comprising:
a sequential writing state that is used for sequential write operations.

10. The system of claim 8, further comprising:
a write data hold time state that allows the system to write to an external device even if a write enable signal is de-asserted.

11. The system of claim 8, further comprising:
logic for validating input signals.

* * * * *

UNITED STATES PATENT AND TRADEMARK OFFICE
CERTIFICATE OF CORRECTION

PATENT NO. : 7,219,182 B2 Page 1 of 1
APPLICATION NO. : 10/385056
DATED : May 15, 2007
INVENTOR(S) : Larry L. Byers et al.

It is certified that error appears in the above-identified patent and that said Letters Patent is hereby corrected as shown below:

| | |
|---|---|
| Column 6, Line 4 | Delete "read" and insert -- reads -- |
| Column 7, Line 8 | Insert -- is -- after "that" |
| Column 16, Line 3 | Delete "6" before "History" |
| Column 18, Line 21 | Insert -- " -- before "mail-box" |

Signed and Sealed this

Thirteenth Day of November, 2007

JON W. DUDAS
*Director of the United States Patent and Trademark Office*